United States Patent
Schwartz et al.

(12)

(10) Patent No.: US 6,801,767 B1
(45) Date of Patent: Oct. 5, 2004

(54) METHOD AND SYSTEM FOR DISTRIBUTING MULTIBAND WIRELESS COMMUNICATIONS SIGNALS

(75) Inventors: Adam L. Schwartz, Campbell, CA (US); David Hart, Sunnyvale, CA (US); John Eisenberg, Los Altos, CA (US); Peter Forth, San Jose, CA (US)

(73) Assignee: LGC Wireless, Inc., San Jose, CA (US)

( * ) Notice: Subject to any disclaimer, the term of this patent is extended or adjusted under 35 U.S.C. 154(b) by 555 days.

(21) Appl. No.: 09/771,320

(22) Filed: Jan. 26, 2001

(51) Int. Cl.[7] .............................................. H04Q 7/20
(52) U.S. Cl. .................... 455/426.2; 398/115; 455/131
(58) Field of Search .............................. 455/131, 132, 455/133, 150.1, 151.2, 151.4, 154.1, 190.1, 192.1, 73, 82, 87, 550.1, 553.1, 552.1, 554.2, 353, 355, 127.4, 168.1, 118, 426.2, 207; 398/115

(56) References Cited

U.S. PATENT DOCUMENTS

| | | | | |
|---|---|---|---|---|
| 5,295,153 A | * | 3/1994 | Gudmundson | ............... 370/335 |
| 5,424,864 A | | 6/1995 | Emura | ......................... 359/173 |
| 5,519,691 A | * | 5/1996 | Darcie et al. | ................ 370/331 |
| 5,694,232 A | * | 12/1997 | Parsay et al. | .................. 398/42 |
| 5,809,395 A | * | 9/1998 | Hamilton-Piercy et al. | . 725/106 |
| 5,832,368 A | * | 11/1998 | Nakano et al. | ............ 455/63.1 |
| 5,880,863 A | * | 3/1999 | Rideout et al. | ............... 398/59 |
| 5,969,837 A | | 10/1999 | Farber et al. | ................ 359/132 |

* cited by examiner

*Primary Examiner*—Charles Appiah
*Assistant Examiner*—Naghmeh Mehrpour
(74) *Attorney, Agent, or Firm*—Lumen Intellectual Property Services, Inc.

(57) ABSTRACT

This invention provides a method and system for distributing multiband wireless communications signals. Downlink RF signals in a plurality of downlink frequency bands are received and then combined into a combined downlink RF signal at the main unit. The combined downlink RF signal is subsequently split into multiple downlink RF-parts, which are converted to multiple downlink optical signals and optically transmitted to the remote units. At each remote unit, a delivered downlink optical signal is first converted back to a downlink RF-part which is subsequently separated into a plurality of downlink RF-groups by frequency band. Each downlink RF-group is individually conditioned (e.g., filtered and amplified). The individual-conditioned downlink RF-groups are then combined and transmitted to a dedicated downlink antenna.

56 Claims, 12 Drawing Sheets

METHOD AND SYSTEM FOR DISTRIBUTING MULTIBAND WIRELESS COMMUNICATIONS SIGNALS

FIELD OF THE INVENTION

This invention relates generally to wireless communications systems. More particularly, it relates to a novel method and system for distributing multiband wireless communication signals.

BACKGROUND ART

As wireless communications become a way of life in society, a challenge to wireless communications network operators is to transport and distribute multiband wireless communications signals in an efficient, flexible, and economical manner. And the challenge is particularly acute in areas that are not traditionally covered by macro-networks. Such areas reside mostly in indoor environments, including airports, malls, office buildings, tunnels, hotels, convention centers, and sports arenas.

Distributed radio systems are conventionally used in the art to provide the radio coverage to the indoor environments, employing an architecture of one distributed antenna system supporting one wireless radio frequency (RF) band. Such an architecture entails that in order to support multiple RF bands, separate distributed antenna systems must be installed in parallel, each accommodating a specific RF band. This is a rather inefficient, and at times, cumbersome undertaking.

The past few years have seen a few other approaches in the art, attempting to distribute multiband wireless communication signals in a more efficient manner. For example, U.S. Pat. No. 5,969,837 by Farber et al. describes a communications system in which multiple RF signals from multiple wireless communications networks are first combined at a base unit. The combined RF signal is then split into multiple outputs, which are subsequently converted to optical signals and transmitted to remote units by optical fibers. At each remote unit, the received optical signal is converted back to an RF signal. The RF signal is then split and routed to separate antennas, wherein each antenna is designated to a specific frequency band (e.g., PCS, GSM, or paging).

A notable disadvantage of the above prior art system is that each frequency band requires a dedicated antenna, which handles both downlink and uplink RF signals by way of a duplexer. (And it should be noted that the duplexer (84) as disclosed by Farber et al. cannot feasibly separate more than one frequency band, particularly intertwined bands such as cellular and iDEN bands.) Such a configuration can become considerably bulky and inefficient, especially when dealing with multiple (e.g., more than two) frequency bands. There are additional shortcomings common to the above and other prior art multiband distributed systems, summarized as follows:

1. The prior art systems typically employ a star architecture, in which each remote unit is connected to a main (or base) unit by a dedicated fiber-optic cable. Such an architecture is inflexible and inefficient for many applications.
2. Strong downlink RF signals transmitted by the main unit tend to interfere with the reception of weak uplink RF signals in a remote unit by saturating the front-end radio receivers.
3. Intermodulation products produced by the nonlinearities in the downlink amplifiers tend to fall into the uplink frequency bands, thereby desensitizing the uplink receivers.
4. Intermodulation products produced in one downlink frequency band often fall into other downlink frequency bands, thereby causing regulatory violations.
5. Adjacent and/or intertwined frequency bands (e.g., iDEN and cellular bands) cannot be feasibly separated and therefore effectively filtered and amplified.
6. The prior art systems cannot support Time Division Duplex (TDD) protocols, in which the downlink and uplink RF signals share the same frequency band but are interleaved in time.
7. The prior art systems are devoid of carrying out an end-to-end gain calibration, such that a prescribed gain for each of the frequency bands is established in each of the remote units.

In view of the forgoing, there is a need in the art for a multiband distributed wireless communications system that overcomes the prior art problems.

SUMMARY

The aforementioned need in the art is provided by a novel method and system for distributing multiband wireless communication signals according to the present invention. In a multiband distributed wireless communications system of the present invention, a main unit is linked to multiple remote units by optical fibers in a hybrid star/cascaded architecture. As a way of example, the main unit can be directly connected to individual remote units, and/or connected to one or more cascaded chains of remote units. The main unit can also be linked to some of the remote units via one or more expansion units in an hierarchical (or tree-like) structure. Such a hybrid star/cascaded architecture of the present invention provides a modular and flexible way of distributing multiband wireless communications signals, particularly in an indoor environment.

In the present invention, multiband wireless communications signals are transported and distributed as follows. On the downlink, a plurality of downlink RF-sets in a plurality of downlink frequency bands transmitted from a plurality of wireless communication networks are received at the main unit. The downlink RF-sets each contain downlink RF signals in one of the downlink frequency bands. Some of these downlink RF signals are frequency-division-duplexed (FDD), such that downlink and uplink RF signals are separate in frequency; while others are time-division-duplexed (TDD), such that downlink and uplink signals share the same frequency band but are separated in time.

The received downlink RF-sets are then combined into a combined downlink RF signal, which is subsequently split into multiple downlink RF-parts. Each downlink RF-part is essentially a "copy" of the combined downlink RF signal in that it contains the downlink RF signals from all of the downlink RF-sets. The downlink RF-parts are then converted to downlink optical signals in a one-to-one correspondence, which are subsequently transmitted to the remote units by way of optical fibers.

At each of the remote units, a delivered downlink optical signal is converted to a delivered downlink RF-part. The delivered downlink RF-part is then separated into a plurality of downlink RF-groups by frequency band. Individual downlink-signal-conditioning is subsequently performed on each of the downlink RF-groups, wherein the downlink-signal-conditioning includes one or more steps of RF-amplifying, gain-adjusting, and RF-filtering. By performing amplification on the downlink RF-groups separately, nonlinear intermodulation products amongst the downlink RF-groups can be effectively avoided. The individual-conditioned downlink RF-groups are then combined and transmitted to a downlink antenna. Note that in the present invention, each remote unit is in RF-communication with at least one downlink antenna dedicated to handle the downlink RF signals transmitted from the remote unit.

Likewise, each of the remote units is also in RF-communication with at least one uplink antenna dedicated to handle the uplink RF signals to be received by the remote unit. Having separate uplink and downlink antennae enables the reception of uplink RF signals and the transmission of downlink RF signals to occur with spatial separation in the present invention. Such spatial separation creates propagation loss between the transmit (uplink) and receive (downlink) antennae, which helps protect the sensitive uplink receiver from being desensitized by strong downlink RF signals and/or by downlink intermodulation products that fall into one or more uplink frequency bands.

On the uplink, multiple uplink RF signals in a plurality of uplink frequency bands are first received by the uplink antenna connected to the remote unit. The received uplink RF signals are then separated into a plurality of uplink RF-groups by frequency band. Individual uplink-signal-conditioning is subsequently performed on each of the uplink RF-groups, which includes one or more steps of RF-amplifying, gain-adjusting, and RF-filtering. The individual-conditioned uplink RF-groups are then combined into an uplink RF-part, which is further converted to an uplink optical signal. As such, multiple uplink optical signals corresponding to multiple uplink RF-parts are optically transmitted from the remote units to the main unit.

At the main unit, the received uplink optical signals are first converted back to the uplink RF-parts. The uplink RF-parts are then combined into a combined uplink RF signal, which is subsequently transmitted to the wireless communications networks.

The present invention advantageously utilizes various frequency translations to allow for separation of downlink RF signals into downlink RF-groups by frequency band using feasible means (such as RF-filtering), whereby these downlink RF-groups can be individually conditioned (e.g., filtered and amplified) at a remote unit before being transmitted to a downlink antenna. The frequency translations can also be effectively used to prevent the interference effects and intermodulation products amongst different (downlink and uplink) frequency bands. For instance, a first frequency-translation may be performed on one or more downlink RF-sets, so as to place the downlink RF-sets in disjoint frequency bands that are sufficiently far apart to allow for economical separation of downlink RF signals in different frequency bands by RF-filtering. Such a task would otherwise be very difficult—if not entirely impossible—to accomplish, particularly when dealing with adjacent (and/or intertwined) frequency bands. At each of the remote units, a second frequency-translation may be subsequently performed on one or more downlink RF-groups, which substantially undoes the effect of the first frequency translation and thereby places the downlink RF signals back to their original downlink frequency bands respectively. There can also be first and second frequency-translations performed on one or more uplink RF-groups at a remote unit, whereby the downlink-signal-conditioning (e.g., RF-filtering, and RF-amplifying) on these downlink RF-groups can be performed more effectively in one or more intermediate frequency bands. Similarly, there can be first and second frequency-translations performed on one or more uplink RF-groups at a remote unit, so as to perform the uplink-signal-conditioning on these uplink RF-groups more effectively in one or more intermediate frequency bands. As such, these frequency translations effectively facilitate the transportation and distribution of multiband RF signals, and are particularly desirable when dealing with RF signals in, adjacent (and/or intertwined) frequency bands.

The present invention further entails carrying out an end-to-end gain calibration, thereby setting a prescribed gain for each of the downlink RF-groups. To maintain the prescribed gain over temperature changes and other effects, a downlink-gain-control signal (e.g., a pilot or an Frequency-Shift-Key signal) that is set to a frequency outside of any of the frequency bands used by the wireless communications networks (and frequency-translated bands) can be injected to and transmitted along with each of the downlink RF-parts to the remote units. At each of the remote units, the downlink-gain-control signal is detected and thereby used to maintain the gain for each of the downlink RF-groups at the prescribed level.

In the present invention, the downlink and uplink optical signals between the main unit and remote units can be further transmitted via one or more expansion units. For example, a downlink optical signal can be first transmitted from the main unit to an expansion unit, where it is amplified and further split into multiple secondary-optical-signals. The secondary-optical-signals are then transmitted to additional remote units (and/or one or more lower-level expansion units). On the uplink, a plurality of uplink optical signals from a number of the remote units can be first transmitted to an expansion unit, where they are amplified and further combined to a combined optical signal. The combined optical signal is then transmitted to the main unit (or to a higher-level expansion unit). The deployment of the expansion units enhances the flexibility and efficiency of the present invention in transporting and distributing multiband wireless communication signals.

In an exemplary embodiment of a multiband distributed wireless communications system according to the present invention, the main unit comprises an RF-downlink-interface for receiving a plurality of downlink RF-sets in a plurality of downlink frequency bands from a plurality of wireless communications networks; a downlink RF-combining means for combining the downlink RF-sets into a combined downlink RF signal; a downlink RF-splitting means for splitting the combined downlink RF signal into multiple downlink RF-parts; and multiple RF-to-optical converters for converting the downlink RF-parts to downlink optical signals. The main unit further comprises multiple optical-to-RF converters for converting the received uplink optical signals to uplink RF-parts; an uplink RF-combining means for combining the uplink RF-parts into a combined uplink RF signal; and an RF-uplink-interface for transmitting the combined uplink RF signal to the wireless communications networks.

Each of the remote units comprises a downlink optical-to-RF converter for converting a delivered downlink optical signal to a delivered downlink RF-part; a downlink splitting-filtering means for separating the downlink RF-part into a plurality of downlink RF-groups by frequency band; a plurality of downlink-signal-conditioning assemblies for performing individual downlink-signal-conditioning on each of the downlink RF-groups, and a downlink filtering-combining means for combining the individual-conditioned downlink RF-groups into a downlink RF-transmit signal, which is to be transmitted to a dedicated downlink antenna. The downlink splitting-filtering means can be provided by a series of RF-filters configured in parallel, each characterized by a distinct frequency passband. Each of the downlink-signal-conditioning assemblies can be in the form of one or more RF-amplifiers, gain-adjusting elements, and RF-filters. Note that in the present invention, each of the remote units is in RF-communication with at least one downlink antenna, dedicated to handle downlink RF signals in a plurality of frequency bands.

Moreover, each of the remote units is in RF-communication with at least one dedicated uplink antenna, from which multiple uplink RF signals in a plurality of uplink frequency bands are received by the remote unit. Each of the remote units further comprises an uplink splitting-filtering means for separating the received uplink RF signals into a plurality of uplink RF-groups by frequency band; a plurality of uplink-signal-conditioning assemblies for performing individual uplink-signal-conditioning on each of the uplink RF-groups; an uplink filtering-combining means for combining the individual-conditioned uplink RF-groups into an uplink RF-part; and an uplink RF-to-optical converter for converting the uplink RF-part to an uplink optical signal. Each of the remote units may be further coupled to an auxiliary antenna by an RF-switching means, whereby downlink RF signals in a TDD frequency band from the remote unit are transmitted to, and uplink RF signals in the TDD frequency band are received at the remote unit from this TDD antenna by actuating the RF-switching means. The RF-switching means can be provided by an RF-(Transmit/Receive)switch coupled to a downlink power-detect means, whereby it is actuated according to the power level of the downlink RF signals in the TDD frequency band as determined by the downlink power-detect means. Alternatively, a downlink RF-switch and an uplink RF-switch can be separately implemented along a downlink TDD RF-path and an uplink TDD RF-path, and further coupled to a downlink power-detect means in a remote unit. By detecting the power level on the downlink TDD RF-path, the downlink power-detect means enables the downlink TDD signals to be transmitted, along with the downlink (FDD) RF signals in other downlink frequency bands, to the downlink antenna; while permitting the uplink TDD signals to be received, along with the uplink (FDD) RF signals in other uplink frequency bands, from the uplink antenna when there is no downlink transmission.

The multiband distributed wireless communications system of the present invention may further comprise a frequency-translation means for performing various frequency-translations on downlink and uplink RF signals, to allow for feasible separation of downlink RF signals into downlink RF-groups by frequency band and to prevent the interference effects and intermodulation products amongst different (downlink and uplink) frequency bands. By way of example, the frequency-translation means may comprise a global-tone mixer (coupled to a global-tone generator) in RF-communication with the downlink RF-combining means at the main unit, so as to perform one or more first frequency-translations on one or more downlink RF-sets and thereby place the downlink RF-sets in disjoint frequency bands that are sufficiently far apart to allow for economical separation of downlink RF signals in different bands by way of RF-filtering. The frequency-translation means may further comprise multiple remote global-tone mixers coupled to the remote units, such that there are one or more remote global-tone mixers in each of the remote units, for performing one or more second frequency-translations and thereby placing the downlink RF-groups back into their original frequency bands respectively. (The remote global-tone mixers may be coupled to a remote global-tone generator, which is substantially the same as the one used in the main unit, or receive a global-tone signal from the main unit.) The frequency-translation means may also be in the form of one or more downlink-local-tone mixers (coupled to a downlink-local-tone generator), in RF-communication with at least one of the downlink-signal-conditioning assemblies in a remote unit. The downlink-local-tone mixers serve to place one or more downlink RF-groups in one or more intermediate frequency bands where the downlink-signal-conditioning on these downlink RF-groups can be more effectively performed, and subsequently place these downlink RF-groups back into their respective original frequency bands. The frequency-translation means may further be in the form of one or more uplink-local-tone mixers (coupled to an uplink-local-tone generator), in RF-communication with one or more uplink-signal-conditioning assemblies in a remote unit. The uplink-local-tone mixers likewise serve to place one or more uplink RF-groups in one or more intermediate frequency bands, such that the uplink-signal-conditioning on these uplink RF-groups can be performed more effectively. Moreover, the frequency-translation means can be in the form of a combination of global-tone and local-tone mixers (and other frequency-translation means known in the art) implemented in the main unit and the remote units, for performing various frequency-translations on downlink and uplink RF signals, so as to best facilitate the distribution of multiband RF signals.

The multiband distributed wireless communications system of the present invention may further comprise a gain-calibration means for carrying out an end-to-end gain calibration (initially or when there is no transmission of downlink RF signals), thereby setting a prescribed gain for each of the downlink RF-groups. As a way of example, the gain-calibration means may be provided by a calibration-tone generator in RF-communication with the downlink RF-combining means in the main unit that injects a calibration tone. The frequency of the calibration tone is set to lie within the frequency band of each downlink RF-group to be calibrated. To maintain the prescribed gain against temperature changes and other effects, one or more gain-control-signal combiners can be implemented in the main unit, for injecting a gain-control-signal (e.g., a pilot or FSK signal) to each of the downlink RF-parts to be transmitted to the remote units. The gain-control-signal is set at a frequency outside of any of the downlink frequency bands used by the wireless communications networks (and frequency-translated bands). Each of the remote units further comprises a downlink RF-splitting means coupled with a downlink gain-control element, for detecting and thereby using the gain-control-signal to maintain the desired gain for each of the downlink RF-groups.

The multiband distributed wireless communications system of the present invention may further comprise one or more expansion units, serving as intermediate hubs for linking the main unit to additional remote units. As a way of example, an expansion unit can be configured in the form of a downlink assembly and an uplink assembly. The downlink assembly may include a downlink optical-to-RF converter for converting a downlink optical signal delivered to the expansion unit to an RF signal; a downlink RF-amplifier for amplifying the RF signal; a downlink RF-to-optical converter for converting the amplified RF signal to an optical signal; and an optical-splitting means for splitting the optical signal to multiple secondary-optical-signals, which are subsequently transmitted to additional remote units (and/or one or more lower-level expansion units). Alternatively, the RF signal may first be split into multiple secondary-RF-signals by an appropriate RF-splitting means, which are then converted to multiple secondary-optical-signals. The uplink assembly may include an optical-combining element for combining multiple uplink optical signals arriving at the expansion unit into a combined optical signal; an uplink optical-to-RF converter for converting the combined optical signal to a combined RF signal; an uplink RF-amplifier for amplifying the combined RF signal; and an uplink RF-to-optical converter for converting the combined RF signal to an optical signal, which is further transmitted to the main unit (or a higher-level expansion unit). Alternatively, the uplink optical signals may first be converted to multiple uplink RF signals, which are subsequently combined into a combined RF signal by a suitable RF-combining means. The exemplary embodiment described above provides only one of many embodiments of a multiband distributed wireless communications system according to the present invention. Those skilled in the art will recognize that a variety of multiband distributed wireless communication systems can be constructed according to the principle of the present invention, and various means and methods can be devised to perform the designated functions in an efficient/equivalent manner. Moreover, various changes, substitutions, and alternations can be made herein without departing from the principle and the scope of the invention. For instance, the combined downlink RF signal may be first converted to a combined optical signal at the main unit, which is subsequently split into multiple downlink optical signals by an appropriate optical-splitting means. Likewise, multiple uplink optical signals received at the main unit may be first combined into a combined optical signal by a suitable optical-combining means, which is then converted to a combined RF signal to be transmitted to the wireless communications networks. Various RF-splitting means, RF-combining means, RF-filtering means, RF-switching means, and frequency-translation means depicted in the above embodiments can be provided by RF-splitters, RF-combiners, RF-filters, RF-switches, RF-circulators, power combiners, duplexers, triplexers (and other suitable multiplexers), frequency mixers and multipliers known in the art. Moreover, a wavelength-division-multiplexing (WDM) filter may be used to transmit a pair of downlink and uplink optical signals along a single optical fiber, thereby reducing the number of optical fibers to be deployed in the system. Additionally, the pilot (or FSK) signals employed in the present invention for the purpose of gain-control can be further utilized to establish digital communications amongst the main unit and remote units.

As such, the method and system for distributing multi-band wireless communication signals according to the present invention provide many advantages over the prior art systems, summarized as follows:

1. The use of separate downlink and uplink antennae dedicated to each remote unit provides a simple and efficient way to transmit and receive RF signals in multiple frequency bands upon downlink and uplink. Such an implementation is especially effective when dealing with multiple (e.g., more than two) wireless frequency bands, including intertwined bands (such as cellular and iDEN bands). Moreover, having separate uplink and downlink antennae enables the reception of uplink RF signals and the transmission of downlink RF signals to be spatially separated in the present invention. Such a spatial separation creates a propagation loss between the transmit (downlink) and receive (uplink) antennae, which helps protect the sensitive uplink receivers from being desensitized by strong downlink RF signals and/or by downlink intermodulation products that fall into one or more uplink frequency bands.

2. By separating downlink (or uplink) RF signals according to frequency band in each remote unit, RF signals in different frequency bands are individually conditioned (e.g., filtered and amplified), before being recombined to be transmitted to a dedicated downlink antenna (or after being received from a dedicated uplink antenna).

3. Various frequency translations employed in the present invention make it possible to separate downlink RF signals into downlink RF-groups by frequency band using feasible means (such as RF-filtering), such that these downlink RF-groups can be individually conditioned (e.g., filtered and amplified) before being transmitted to a downlink antenna in a remote unit. The frequency translations can also be effectively utilized to prevent the interference effects and intermodulation products amongst different (downlink and uplink) frequency bands. As such, these frequency translations effectively facilitate the transportation and distribution of wireless RF signals in multiple frequency bands, and are particularly desirable when dealing with RF signals in adjacent (and/or intertwined) frequency bands.

4. The gain for each of the downlink RF-groups is individually calibrated and established at a prescribed level, and further maintained over temperature changes and other extraneous effects.

5. The present invention support both FDD and TDD protocols in a simple and flexible way. The use of an RF-switching means to couple a TDD antenna to a remote unit, or the implementation of appropriate RF-switches coupled with an RF power-detect means in a remote unit, provides a simple and effective way of transmitting and receiving TDD signals. Such implementations prevent the noise transmitted on the downlink from desensitizing the reception on the uplink (since the uplink and downlink share the same frequency band for TDD protocols).

6. The employment of a novel hybrid star/cascaded architecture provides a modular, flexible and efficient way of distributing multiband wireless RF signals.

7. The use of a pilot (or an FSK) signal not only provides an effective way of maintaining the desired gain for each of the downlink RF-groups, it can also be utilized to establish an effective communication link between the main unit and the remote units.

All in all, the present invention provides an efficient, flexible, and economical way of transporting and distributing wireless communication signals in multiple (adjacent, intertwined, or otherwise) frequency bands.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1:
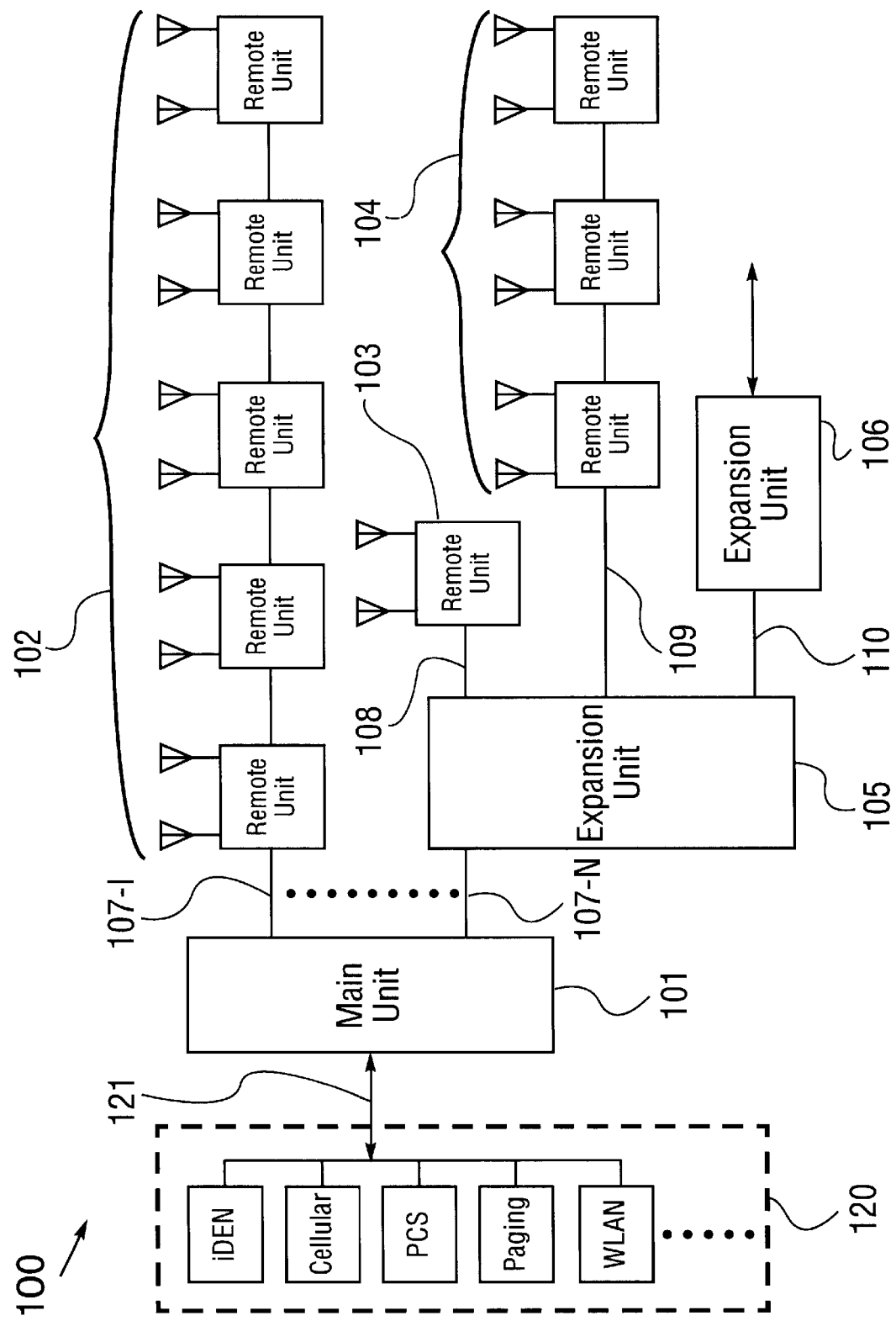
FIG. 1 depicts an exemplary embodiment of a multiband distributed system, in which a main unit is linked to multiple remote units in a hybrid star/cascaded architecture, according to the present invention.

FIG. 1 depicts an exemplary embodiment of a multiband distributed wireless communications system according to the present invention. By way of example to illustrate the principal concept and the topological structure of a hybrid star/cascaded architecture of the present invention, the exemplary multiband distributed wireless communications system 100 comprises a main unit 101; multiple remote units including a first cascaded chain of remote units 102, an individual remote unit 103, and a second cascaded chain of remote units 104; and first and second expansion units 105, 106. A plurality of wireless communications networks 120, including (but not limited to) iDEN, cellular, PCS, paging, and WLAN base-stations (BTS), is connected to main unit 101 by way of an RF-signal transfer means 121 (such as one or more coaxial RF-cables). Main unit 101 is in turn connected to multiple remote units and expansion units by a plurality of primary-optical-fibers 107-1 through 107-N, including first cascaded chain of remote units 102 by primary-optical-fiber 107-1 and first expansion unit 105 by primary-optical-fiber 107-N. (The remote units linked to main unit 101 by other members of primary-optical-fibers 107-1 through 107-N are not shown in FIG. 1). First expansion unit 105 is further connected to individual remote unit 103 by first secondary-optical-fiber 108, to second cascaded chain of remote units 104 by second secondary-optical-fiber 109, and to second expansion unit 106 by third secondary-optical-fiber 110. (Second expansion unit 106 may likewise be connected to additional remote units and expansion units that are not shown in FIG. 1).

As such, multiband distributed wireless communications system 100 of the present invention utilizes a hybrid star/cascaded architecture to link a main unit to multiple remote units distributed throughout the system. The implementation of one or more expansion units further provides an hierarchical structure, in which the expansion units each serve as an intermediate hub and thereby link a variety of remote units (in individual and cascaded forms) to the main unit in a "tree-like" ramified structure. This novel architecture of the present invention provides a modular, flexible, and efficient way of transporting and distributing multiband wireless communications signals, which is particularly effective in an indoor environment.

In the present invention, the wireless communications networks 120 include, but are not limited to, paging, cellular, PCS, UMTS, GSM, CDMA, TDD, FDMA, GPS, EDGE, W-CDMA, bluetooth, WLAN (wide area data) and LAN (local area data) networks, and the like. Some of these downlink RF signals transmitted from these wireless networks are frequency-division-duplexed (FDD), such that downlink and uplink RF signals are separate in frequency; while others are time-division-duplexed (TDD), such that downlink and uplink signals share the same frequency band but are time multiplexed.

Figure 2A:
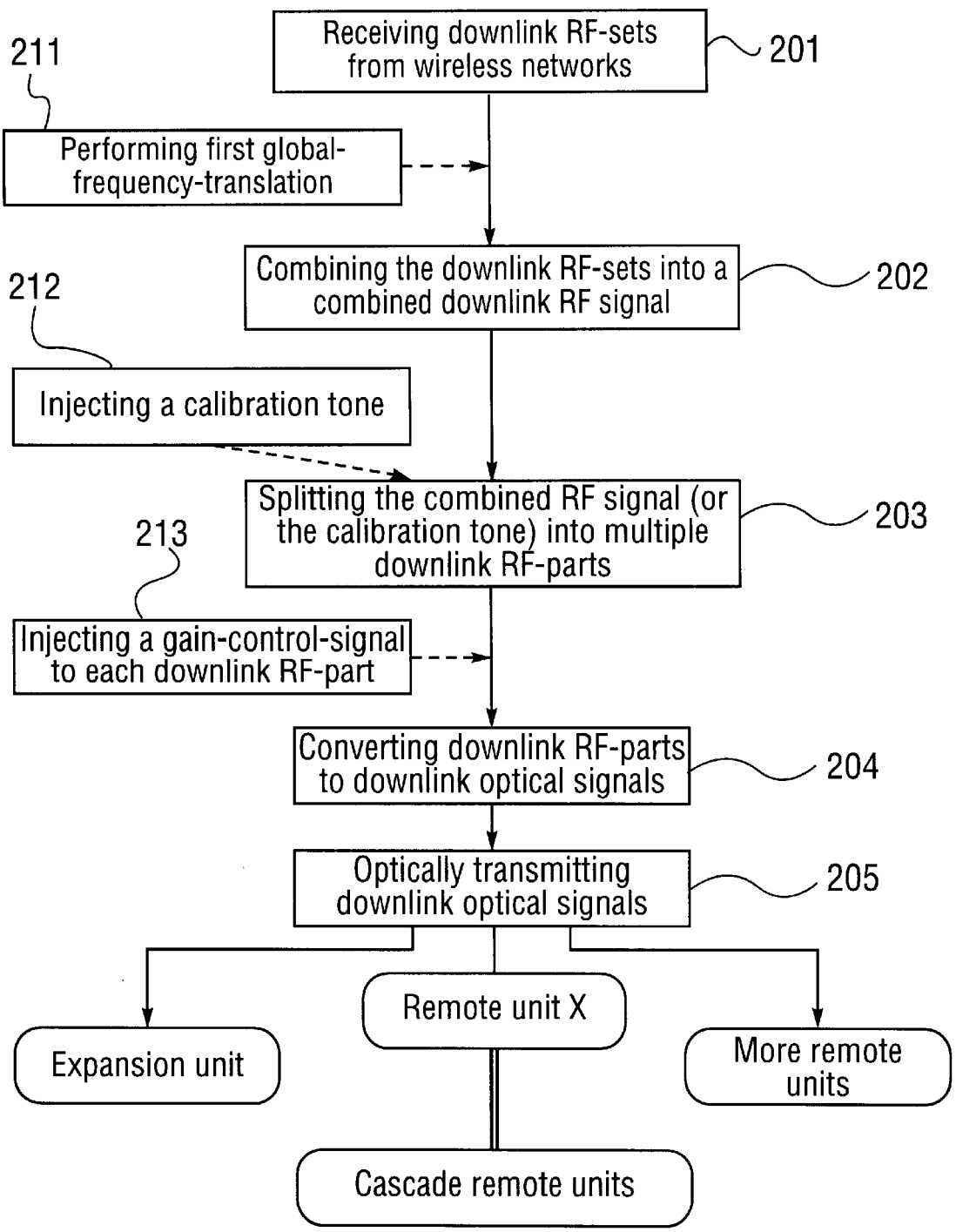
FIGS. 2A–2D show flowcharts illustrating an exemplary method of the present invention for transporting and distributing multiband wireless communication signals on the downlink and uplink.
Figure 2B:
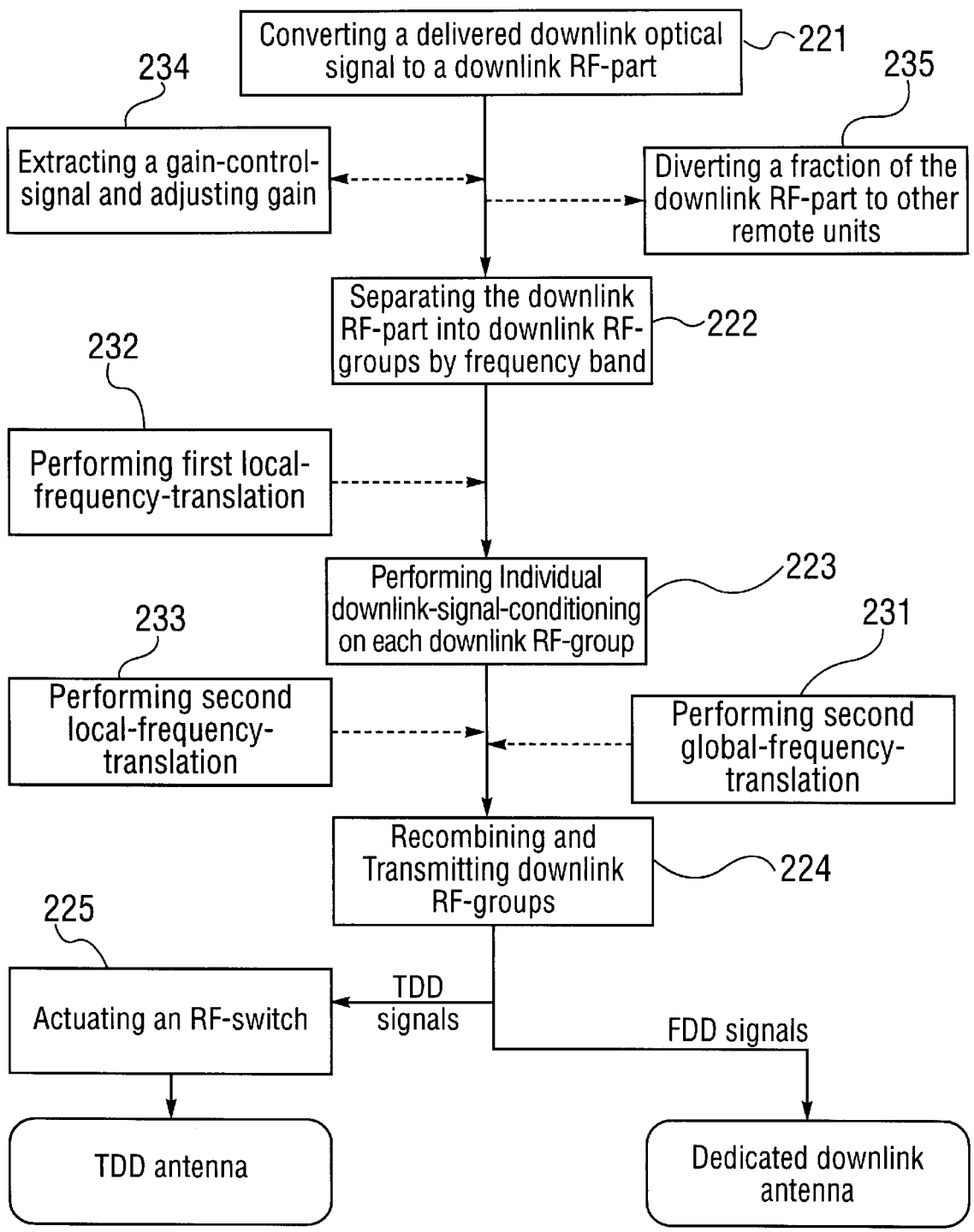

FIGS. 2A–2B show two flowcharts illustrating an exemplary method of the present invention for distributing multiband wireless communication signals on the downlink according to the present invention. Shown in FIG. 2A is an exemplary downlink operation at a main unit, as a way of example to illustrate the general principle of the present invention. A plurality of downlink RF-sets in a plurality of downlink frequency bands are received at the main unit in step 201, wherein each of the downlink RF-sets is a collection of downlink RF signals in a given downlink frequency band transmitted from one of the wireless communications networks. The received downlink RF-sets are then combined into a combined downlink RF signal in step 202. The combined downlink RF signal is subsequently split into multiple downlink RF-parts in step 203, such that each of the downlink RF-parts is essentially a "copy" of the combined downlink RF signal in that it contains the downlink RF signals from all of the downlink RF-sets. The downlink RF-parts are then converted to downlink optical signals in a one-to-one correspondence in step 204, which are subsequently transmitted to multiple remote units and one or more expansion units by optical fibers in step 205. Depicted in FIG. 2B is an exemplary downlink operation at an exemplary remote unit X, as a way of example to illustrate the general principle of the present invention. A delivered downlink optical signal is converted to a delivered downlink RF-part in step 221. The delivered downlink RF-part is then separated into a plurality of downlink RF-groups by frequency band in step 222, whereby each downlink RF-group contains downlink RF-signals in a downlink frequency band. (In the case where there are adjacent/intertwined frequency bands, a downlink RF-group may, depending on implementation, contain downlink RF signals in frequency bands corresponding to one or more of the downlink RF-sets.) Individual downlink-signal-conditioning is subsequently performed on each of the downlink RF-groups in step 223, wherein the downlink-signal-conditioning includes one or more steps of RF-amplifying, gain-adjusting, and RF-filtering. An advantage of performing separate amplification on each of the downlink RF-groups is that nonlinear intermodulation products amongst the downlink RF-groups can be avoided. The individual-conditioned downlink RF-groups are then combined and transmitted to one or more downlink antennae dedicated to remote unit X in step 224. Note that in the present invention, each remote unit is in RF-communication with at least one downlink antenna dedicated to handle the downlink RF signals transmitted from the remote unit. Additionally, it is possible to transmit downlink RF signals in a TDD frequency band to a separate TDD antenna by actuating an RF-switching means, as recited in step 225; while transmitting the downlink RF signals in all other frequency bands (supporting FDD protocols) to a downlink antenna. As a way of example, the actuation of the RF-switching means is accomplished by detecting the power level of the downlink TDD signals: when there is an appreciable power level associated with the downlink TDD signals, the RF-switching means is actuated to transmit; otherwise, the RF-switching means is activated to receive. (It should be noted that the downlink TDD signals can be alternatively transmitted along with the downlink RF signals in other downlink FDD frequency bands to the downlink antenna, and the uplink TDD signals can be alternatively received along with the uplink RF signals in other uplink FDD frequency bands from the uplink antenna, by implementing appropriate RF-switches and RF power-detect means in a remote unit.)

FIG. 2A further comprises step 211 of performing first global-frequency-translation on one or more downlink RF-sets, so as to place the downlink RF-sets in disjoint frequency bands that are sufficiently far apart to allow economical RF-filtering means to separate these frequency bands into downlink RF-groups. Accordingly, FIG. 2B further comprises step 231 of performing a second global-frequency-translation on one or more downlink RF-groups at remote unit X, which substantially undoes the effect of the first global-frequency-translation and thereby places the downlink RF signals back to their original downlink frequency bands respectively. Additionally, there can be first and second local-frequency-translations performed on one or more downlink RF-groups at remote unit X as recited in steps 232, 233, whereby the downlink-signal-conditioning (e.g., RF-filtering and RF-amplifying) on these downlink RF-groups can be performed more effectively in one or more intermediate frequency bands.

FIG. 2A further comprises step 212 of injecting a calibration tone for carrying out an end-to-end gain calibration and thereby setting a prescribed gain for each of the downlink RF-groups. The end-to-end calibration for a specific downlink RF-group is accomplished by transmitting the calibration tone, set to a frequency within the frequency band of the downlink RF-group to be calibrated, from the main unit to the remote units. At each of the remote units the calibrated tone passes through a specific downlink RF-path corresponding to the downlink RF-group to be calibrated. The downlink RF-path contains various RF-amplifiers, gain-adjusting elements, and RF-filters for performing downlink-signal-conditioning. The strength of the calibrated tone is measured at the end of the downlink RF-path. This measurement provides a gauge of the system gain all the way from the main unit, through the specific downlink RF-path, to the point of the remote unit where the downlink RF signals would be ready to be transmitted to the downlink antenna. Based on this measurement, the gain of the downlink RF-group in the remote units can be adjusted to set the system gain to an accurate, prescribed level. The process is repeated for each of the downlink RF-groups.

To maintain the prescribed gain for each of the downlink RF-groups over temperature changes and other effects, FIG. 2A further includes step 213 of injecting a downlink-gain-control signal, such as a pilot or Frequency-Shift-Key (FSK) signal, to each of the downlink RF-parts preceding step 204. The downlink-gain-control signal is set to a frequency outside of any of the downlink frequency bands (and frequency-translated bands). Accordingly, FIG. 2B further includes step 234 of detecting and thereby using the downlink-gain-control signal to maintain the gain for each of the downlink RF-groups at the prescribed level. (As a way of example, immediately after the end-to-end calibration for each of the downlink RF-groups takes place, the power level of the pilot signal can be measured at each remote unit. This measurement establishes what the desired power level of the pilot signal should be when the system gain is set at the prescribed level. Subsequently in the course of normal operation, each remote unit continuously (or periodically) monitors the power level of the pilot signal transmitted to it and adjusts its gain to maintain the power level of the pilot signal at the desired value. Since the gain for each downlink RF-group is initially set by the end-to-end calibration, it is subsequently maintained in reference to the corrected system gain through use of the pilot signal.

Figure 2C:
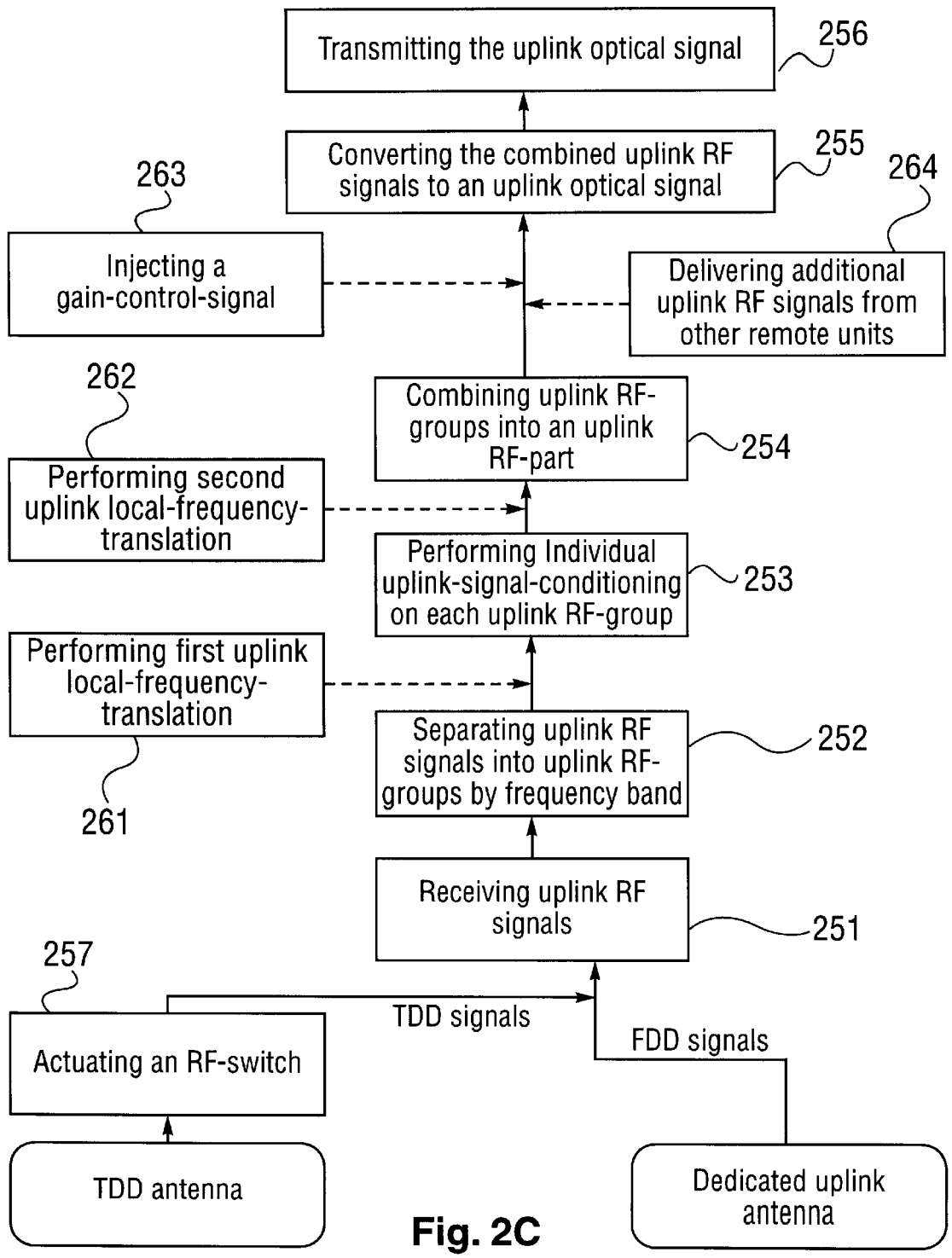
Figure 2D:
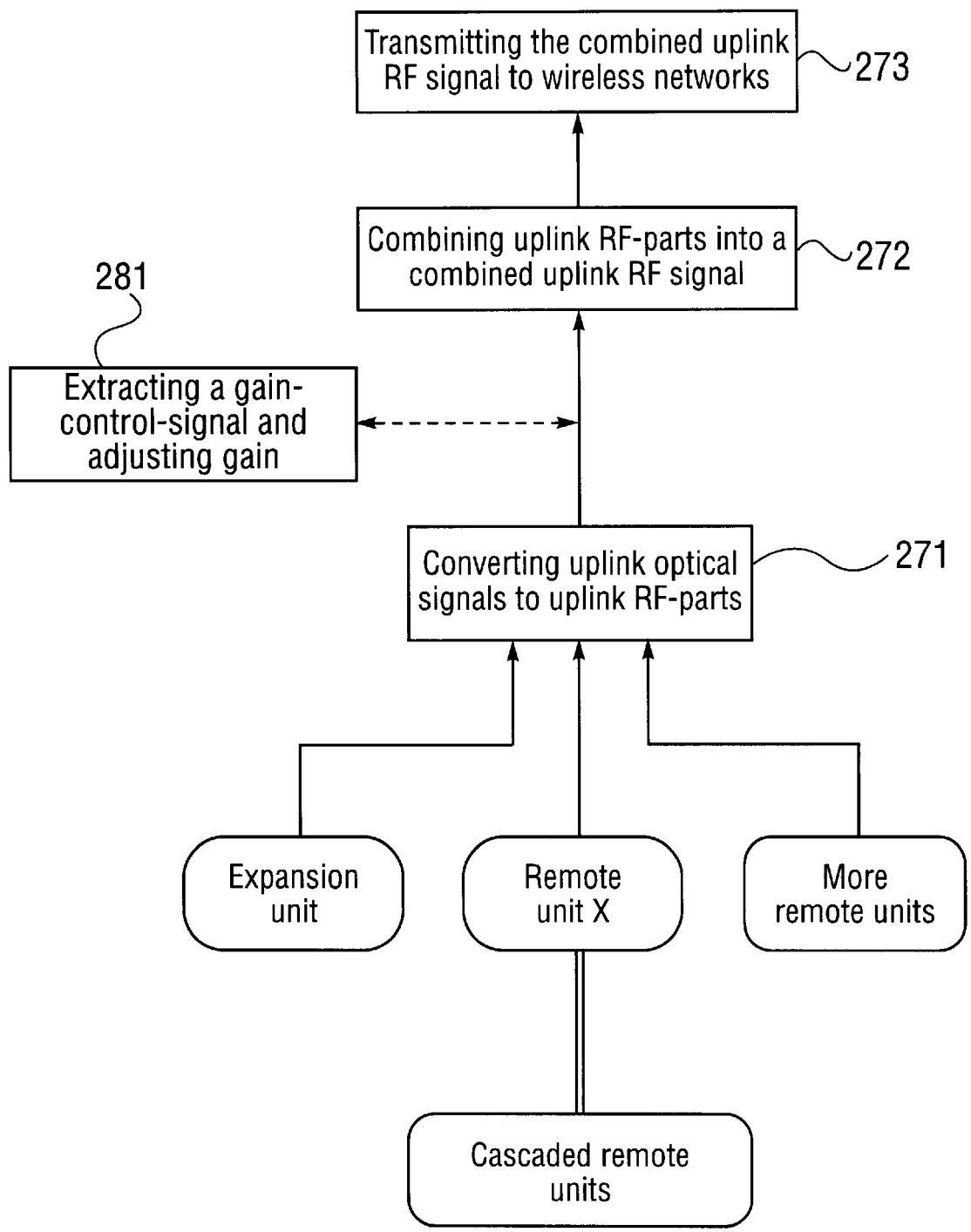

FIGS. 2C–2D show two flowcharts illustrating an exemplary method of the present invention for transmitting multi-band wireless communication signals on the uplink. Shown in FIG. 2C is an exemplary uplink operation at the exemplary remote unit X described in FIG. 2B, as a way of example to further illustrating the general principle of the present invention. Multiple uplink RF signals in a plurality of uplink frequency bands are first received from an uplink antenna at remote unit X in step 251. (As on the downlink, each remote unit is in RF-communication with at least one uplink antenna dedicated to handle uplink RF signals.) Additional uplink RF signals in the TDD frequency band may be separately received at remote unit X from a TDD antenna by way of actuating an RF-switch, as recited in 257. The received uplink RF signals are then separated into a plurality of uplink RF-groups by frequency band in step 252. Individual uplink-signal-conditioning is subsequently performed on each of the uplink RF-groups in step 253, which includes one or more steps of RF-amplifying, gain-adjusting, and RF-filtering. The individual-conditioned uplink RF-groups are then combined into an uplink RF-part in step 254, which is further converted to an uplink optical signal in step 255. The uplink optical signal is then transmitted to the main unit (or an expansion unit) in step 256. As such, multiple uplink optical signals corresponding to multiple uplink RF-parts are optically transmitted from the remote units to the main unit.

Depicted in FIG. 2D is an exemplary uplink operation at the main unit described in FIG. 2A, as a way of example to further illustrating the general principle of the present invention. The uplink optical signals delivered to the main unit are first converted back to the uplink RF-parts in step 271. The uplink RF-parts are then combined into a combined uplink RF signal in step 272, which is subsequently transmitted to the wireless communications networks in step 273.

FIG. 2C further comprises performing first and second uplink local-frequency-translations on one or more uplink RF-groups as recited in steps 261, 262, so as to perform the uplink-signal-conditioning on these uplink RF-groups more effectively in one or more intermediate frequency bands. To maintain the gain for each of the uplink frequency bands at a desired level, FIG. 2C further includes step 263 of injecting a gain-control-signal (e.g., a pilot or FSK signal) to the uplink RF-part preceding step 255. Accordingly, FIG. 2D further includes step 281 of detecting and thereby using the gain-control-signal to maintain the desired gain for each of the uplink frequency bands at the main unit.

Referring back to FIG. 2B, step 235 entails diverting a fraction of the delivered downlink RF-part to other remote units, preceding step 222. Such a process is involved in applications where remote unit X is in a cascaded chain of remote units (such as first cascaded chain of remote units 102 in FIG. 1). Similarly, FIG. 2C further includes step 264 of delivering additional uplink RF signals from other remote units and combining these additional uplink RF signals with the uplink RF-part, preceding step 255. This process also occurs in situations where remote unit X is cascaded with other remote units.

Those skilled in the art will recognize that the exemplary embodiments of FIGS. 2A–2D provides only one of many ways of transporting and distributing multiband wireless communication signals in accordance with the principle of the present invention. Various changes, substitutions, and alternations can be made herein without departing from the principle and the scope of the invention. Moreover, alternative means and methods can be devised to perform the designated functions in an efficient/equivalent manner. A skilled artisan can devise a particular method for distributing multiband wireless communication signals according to the present invention, to best suit a given application.

The following drawings and description provide exemplary embodiments of the main unit, remote units and expansion units depicted in FIG. 1 and described in FIGS. 2A–2D.

Figure 3A:
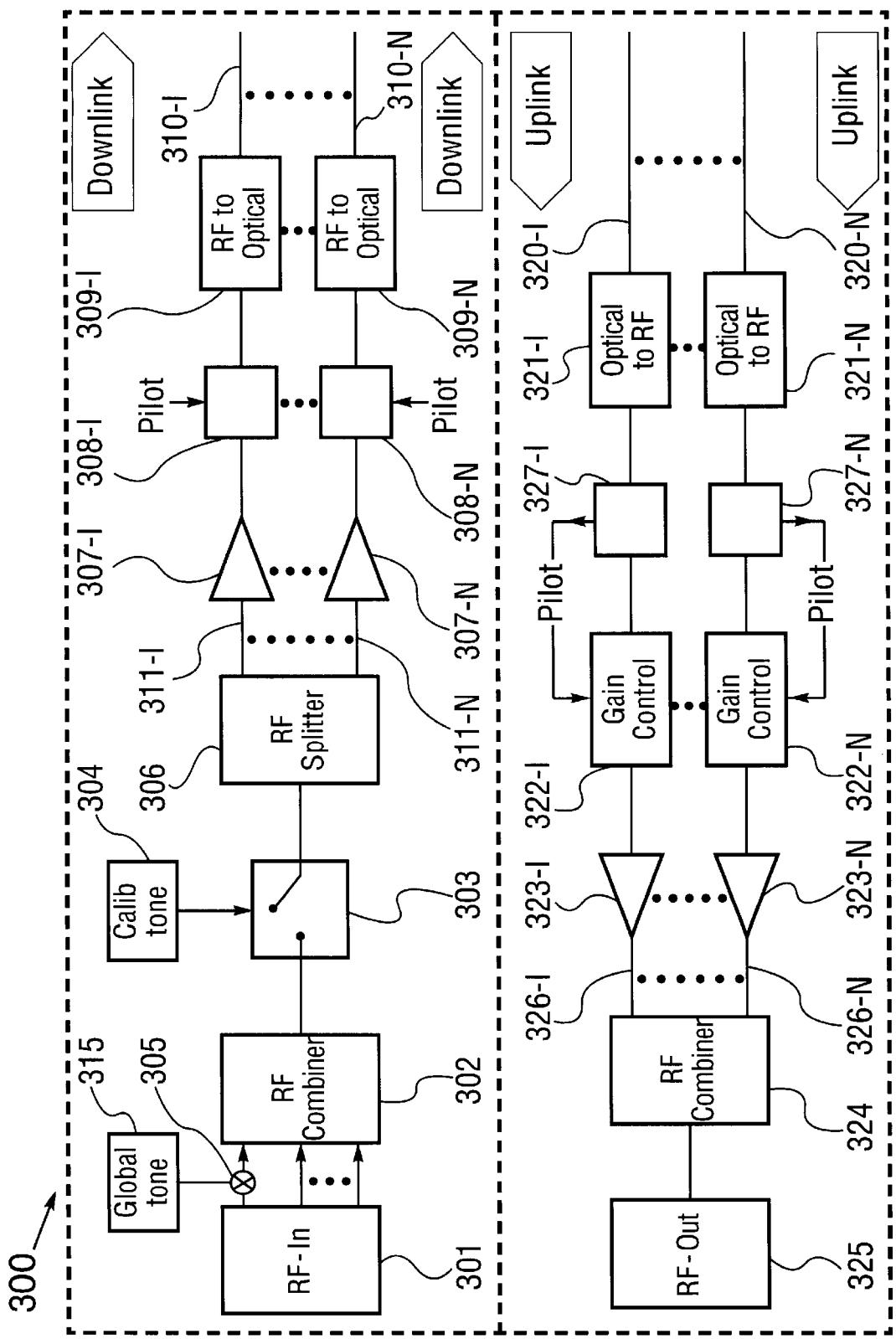
FIGS. 3A–3C show exemplary embodiments of a main unit and a remote unit respectively, according to the present invention.

FIG. 3A depicts an exemplary embodiment of a main unit according to the present invention. On the downlink route, main unit 300 comprises a downlink-RF-interface, 301 for receiving a plurality of downlink RF-sets in a plurality of downlink frequency bands from a plurality of wireless communications networks; a frequency-translation means including a first global-tone mixer 305 (coupled to a global-tone generator 315) for performing a first global-frequency-translation on one or more downlink RF-sets; a downlink RF-combiner 302 for combining the received downlink RF-sets into a combined downlink RF signal; an RF-switch 303 coupled to a gain-calibration means in the form of a calibration-tone generator 304 for purpose of carrying out an end-to-end gain calibration; a downlink RF-splitter 306 for splitting the combined downlink RF signal into multiple downlink RF-parts; multiple downlink RF-amplifiers 307-1 through 307-N for amplifying the downlink RF-parts; multiple downlink gain-control-signal combiners 308-1 through 308-N for injecting a gain-control-signal signal (such as a pilot signal) into each of the downlink RF-parts; and multiple RF-to-optical converters 309-1 through 309-N for converting the downlink RF-parts along with the injected pilot signals to downlink optical signals, which are subsequently transmitted to remote units by multiple downlink optical fibers 310-1 through 310-N. Note that structurally, downlink RF-splitter 306 effectively leads to multiple downlink RF-paths 311-1 through 311-N, each including a downlink RF-amplifier, a downlink gain-control-signal combiner, followed by an RF-to-optical converter.

RF-switch 303 serves to facilitate the end-to-end gain calibration described above. When performing an end-to-end gain calibration for each of the downlink RF-groups initially (or when there is no transmission of downlink RF signals), RF-switch 303 flips to calibration-tone generator 304, so as to allow a calibration tone to pass and further split along multiple downlink RF-paths 311-1 through 311-N. The frequency of the calibration tone is adjusted to lie within the frequency band of a specific downlink RF-group to be calibrated. The calibration tone is transmitted to the remote units, where it is measured and the gain for the specific downlink RF-group is set accordingly at a prescribed level. After the end-to-end calibration is carried out for each of the downlink RF-groups, RF switch 303 flips back to connect downlink RF-combiner 302 to downlink RF-splitter 306, thereby allowing passage of the downlink RF signals during normal operation.

On the uplink route, main unit 300 comprises multiple optical-to-RF converters 321-1 through 321-N for converting multiple uplink optical signals delivered to the main unit by multiple uplink optical fibers 320-1 through 320-N to multiple uplink RF-parts; multiple uplink RF-splitting elements 327-1 through 327-N for extracting a gain-control-signal such as a pilot signal from each of the uplink RF-parts; multiple uplink gain-control elements 322-1 through 322-N for using the extracted gain-control-signal to adjust the gain of each of the uplink RF-parts; multiple uplink RF-amplifiers 323-1 through 323-N for amplifying the uplink RF-parts; an uplink RF-combiner 324 for combining the uplink RF-parts to a combined uplink RF signal; and an uplink-RF-interface 325 for transmitting the combined uplink RF signal to the wireless communications networks. As such, there are effectively multiple uplink RF-paths 326-1 through 326-N converging to uplink RF-combiner 324, wherein each of the uplink RF-paths includes an optical-to-RF converter, an uplink RF-splitting element; an uplink gain-control element, and an RF-amplifier. Additional RF-signal-conditioning elements (such as RF-filters) can be further implemented in each of the uplink RF-paths.

Figure 3B:
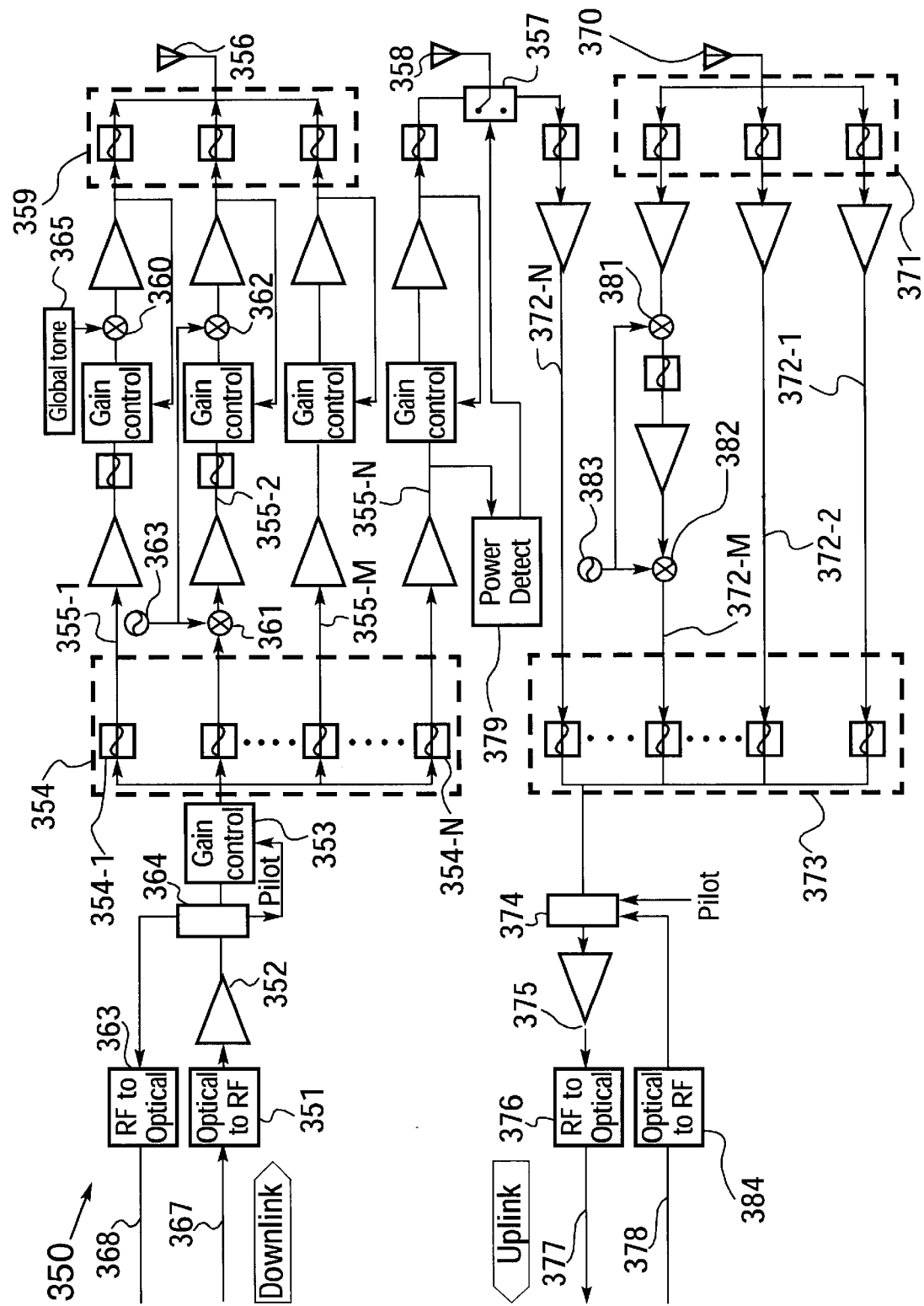

FIG. 3B shows an exemplary embodiment of a remote unit according to the present invention. On the downlink route, remote unit 350 comprises a downlink optical-to-RF converter 351 that converts a downlink optical signal delivered by a downlink optical fiber 367 to a delivered downlink RF-part (which may include a gain-control-signal such as a pilot signal); a downlink RF-amplifier 352 for amplifying the delivered downlink RF-part; a downlink RF-splitting element 364 for extracting a gain-control-signal such as a pilot signal; a downlink gain-control element 353 for using the extracted gain-control-signal to perform gain adjustment; a downlink splitting-filtering assembly 354 in the form of a plurality of downlink RF-filters 354-1 (for frequency band-1) through 354-N (for TDD frequency band), for splitting the downlink RF-part into a plurality of downlink RF-groups by frequency band; and a plurality of downlink-signal-conditioning assemblies 355-1 through 355-N for performing individual downlink-signal-conditioning (e.g., RF-amplifying and RF-filtering) on each of the downlink RF-groups. As a way of example, downlink-signal-conditioning assembly 355-N is coupled to downlink RF-filter 354-N for performing downlink-RF-signal-conditioning on downlink RF signals in a TDD frequency band, and is further coupled to a TDD antenna 358 by way of an RF-switching means in the form of an RF-(Transmit/Receive)switch 357 and a downlink power-detect element 379. The remainder of the downlink-signal-conditioning assemblies is in RF-communication with a downlink filtering-combining assembly 359, which combines the individual conditioned downlink RF-groups into a downlink RF-transmit signal to be transmitted to a downlink antenna 356. Note that downlink antenna 356 is dedicated for handling the downlink RF signals in all other downlink (FDD) frequency bands (than the TDD band) transmitted from remote unit 350.

In the embodiment of FIG. 3B, each of the constituent RF-filters in downlink splitting-filtering assembly 354 has a characteristic frequency passband, so as to let RF signals in a selected frequency band to pass and filter out RF signals in all other frequency bands. Each downlink-signal-conditioning assembly generally comprises one or more RF-amplifiers, gain-control elements, and RF-filters, as exemplified by downlink-signal-conditioning assemblies 355-M and 355-N. Downlink-signal-conditioning assembly 355-1 further includes a second global-tone mixer 360 (coupled to a global-tone generator 365), for performing a second global-frequency-translation that substantially undoes the effects of the first global-frequency-translation performed on the downlink RF signals in frequency band-1 at main unit 300 of FIG. 3A. (Note: global-tone generator 365 in remote unit 350 of FIG. 3B is substantially the same as global-tone generator 315 in main unit 300 of FIG. 3A. Alternatively, the global-tone signal generated by global-tone generator 315 in main unit 300 of FIG. 3A can be transmitted to each of the remote units in the system, and coupled to global-tone mixer 360 in remote unit 350, for instance. Moreover, the combination of first global-tone mixer 305 in main unit 300 of FIG. 3A and second global-tone mixer 360 in remote unit 350 of FIG. 3B constitutes one embodiment of a frequency-translation means in the present invention.) Downlink-signal-conditioning assembly 355-2 further includes first and second downlink-local-tone mixers 361, 362 (coupled to a downlink-local-tone generator 363) for performing first and second local-frequency-translations on the downlink RF signals in frequency band-2, thereby enabling the downlink-signal-frequency conditioning (such as RF-amplifying and RF-filtering) on these RF signals to be performed more effectively in an intermediate frequency band. (Note: the combination of first and second downlink-local-tone mixers 361, 362 provides another embodiment of a frequency-translation means in the present invention.)

On the uplink route, remote unit 350 comprises an uplink splitting-filtering assembly 371 for splitting multiple uplink RF signals in a plurality of uplink frequency bands into a plurality of uplink RF-groups by frequency band; a plurality of uplink-signal-conditioning assemblies 372-1 through 372-N for performing individual uplink-signal-conditioning on each of the uplink RF-groups; an uplink filtering-combining assembly 373 for combining the uplink RF-groups into an uplink RF-part; an uplink RF-combining element 374 for combining an uplink gain-control-signal such as a pilot signal with the uplink RF-part; an uplink RF-amplifier 375 for amplifying the uplink RF-part (along with the injected pilot signal); and an uplink RF-to-optical converter 376 for converting the uplink RF-part (along with the injected pilot signal) to an uplink optical signal, which is subsequently transmitted to main unit 300 of FIG. 3A (or an expansion unit not shown) by an uplink optical fiber 377.

In the embodiment of FIG. 3B, uplink splitting-filtering assembly 371 is in RF-communication with an uplink antenna 370, dedicated for receiving uplink RF signals in all other uplink (FDD) frequency bands (than the TDD band). Each of the constituent uplink RF-filters in uplink splitting-filtering assembly 371 is characterized by a distinct frequency passband, so as to let uplink RF signals in a selected uplink frequency band to pass and block off RF signals in all other frequency bands. Each uplink-signal-conditioning assembly generally comprises one or more RF-amplifiers and RF-filters. Uplink-signal-conditioning assembly 372-M further includes first and second uplink-local-tone mixers 380, 381 (coupled to an uplink-local-tone generator 383) for performing first and second uplink local-frequency-translations on the uplink RF signals in uplink frequency band-M, thereby enabling the uplink-signal-conditioning (such as RF-filtering and RF-amplifying) on these uplink signals to be performed more effectively in an intermediate frequency band. (Note: the combination of first and second uplink-local-tone mixers 381, 382 also constitutes an embodiment of a frequency-translation means in the present invention.)

RF-switch 357 in the embodiment of FIG. 3B further couples TDD antenna 358 to uplink-signal-conditioning assembly 372-N designated for handling TDD frequency band. RF-switch 357 is actuated according to the presence of the downlink TDD signals as determined by downlink power-detect element 379 coupled to downlink-signal-conditioning assembly 355-N. That is, when there is an appreciable power level associated with the downlink TDD signals, downlink power-detect element 379 causes RF-switch 357 to flip to downlink-signal-conditioning assembly 355-N, thereby enabling the downlink TDD signals to be transmitted to TDD antenna 358. When no power is detected on the downlink path, RF-switch 357 flips to uplink-signal-conditioning assembly 372-N, thereby allowing the uplink RF signals in the TDD frequency band to be received at remote unit 350. (Note: RF-switch 357 can be alternatively replaced by an RF circulator, a power combiner, or other means known in the art.)

Those skilled in the art will recognize that other RF techniques can be used to facilitate the transmission of downlink TDD signals to and the reception of uplink TDD signals from the TDD antenna. For instance, an RF circulator (or a power combiner) can be alternatively (however less effectively) used to replace RF-switch 357 in the embodiment of FIG. 3B. With this approach the downlink amplifiers in the downlink TDD path should be turned off during receive timeslots so that the noise generated on the downlink TDD path does not desensitize the uplink TDD path to reception of weak TDD signals.

Figure 3C:
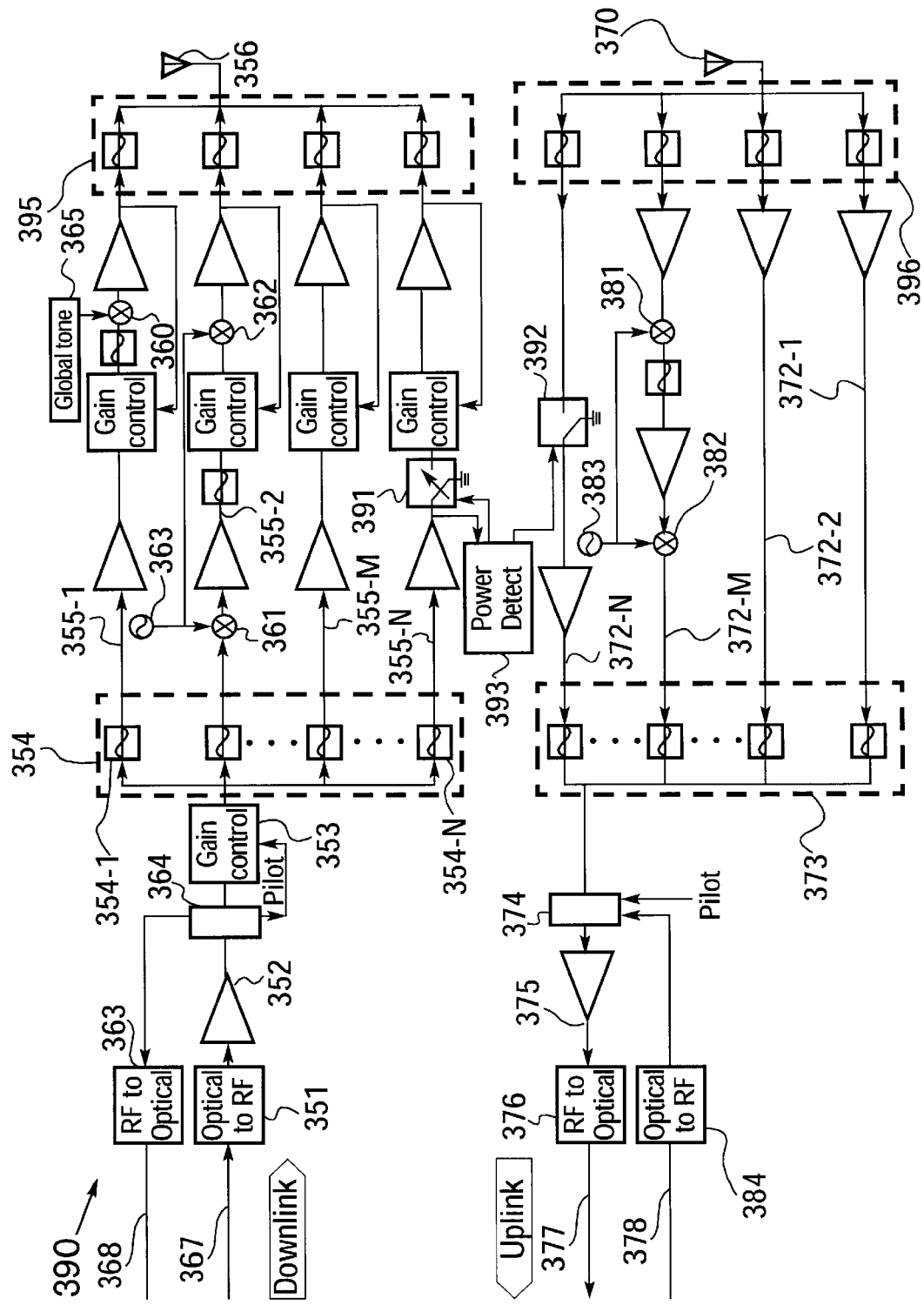

FIG. 3C shows an alternative embodiment of a remote unit according to the present invention, illustrating an alternative way of transmitting and receiving TDD signals. In remote unit 390, rather than using a separate TDD antenna, a downlink RF-switch 391 and an uplink RF-switch 392 are implemented in downlink-signal-conditioning assembly 355-N and in uplink-signal-conditioning assembly 372-N respectively. Downlink RF-switch 391 and uplink RF-switch 392 are further connected to a downlink power-detect element 393, coupled to downlink-signal-conditioning assembly 355-N for detecting the power level of the downlink TDD signals. In this case, a downlink filtering-combining assembly 395 is coupled to all downlink-signal-conditioning assemblies 355-1 through 355-N, and is further in RF-communication with downlink antenna 356. An uplink splitting-filtering assembly 396, in RF-communication with uplink antenna 370, is coupled to all uplink-signal-conditioning assemblies 372-1 through 372-N. The remainder of remote unit 390 is configured in a way similar to, and therefore shares many of the components used in the embodiment of FIG. 3B. In operation, upon detecting an appreciable power level associated with the downlink TDD signals, downlink power-detect element 393 causes downlink RF-switch 391 to close (while leaving uplink RF-switch 392 open), thereby permitting the downlink TDD signals to be transmitted, along with the downlink FDD RF signals in other downlink frequency bands, to downlink antenna 356. Conversely, if no power is detected on the downlink TDD path, downlink power-detect element 393 keeps uplink RF-switch 392 closed (while leaving downlink RF-switch 391 open), thereby allowing the uplink TDD signals to be received, along with the uplink FDD RF signals in other uplink frequency bands, from uplink antenna 370. One disadvantage of this embodiment is that some TDD protocols require transmission and reception of TDD signals from the same location, in order to ensure the same RF propagation characteristics for both uplink and downlink TDD signals.

In either of the embodiments of FIGS. 3B and 3C, having separate uplink and downlink antennae not only simplifies the transmission and reception of (FDD) RF signals in multiple RF bands, but also enables the reception of uplink RF signals and the transmission of downlink RF signals to be spatially separated in the present invention. Such a spatial separation creates a propagation loss between the transmit (downlink) and receive (uplink) antennae, which helps protect the sensitive uplink receivers from being desensitized by strong downlink RF signals and/or by downlink intermodulation products that fall into one or more uplink frequency bands.

Referring back to the embodiment of FIG. 3B, remote unit 350 further comprises a downlink RF-to-optical converter 363 for converting a fraction of the delivered downlink RF-part diverted from downlink RF-splitting element 364 to an optical signal, which is to be transmitted to other remote units by a first auxiliary optical fiber 368. There is also an uplink optical-to-RF converter 384 for converting additional uplink optical signals transmitted from other remote units by a second auxiliary optical fiber 378 to additional uplink RF signals, which are then combined with the uplink RF-part (along with a gain-control-signal such as a pilot signal) by uplink RF-combining element 374. The combined uplink RF signal is then converted to an uplink optical signal, to be transmitted to the main unit (or an expansion unit).

Figure 4A:
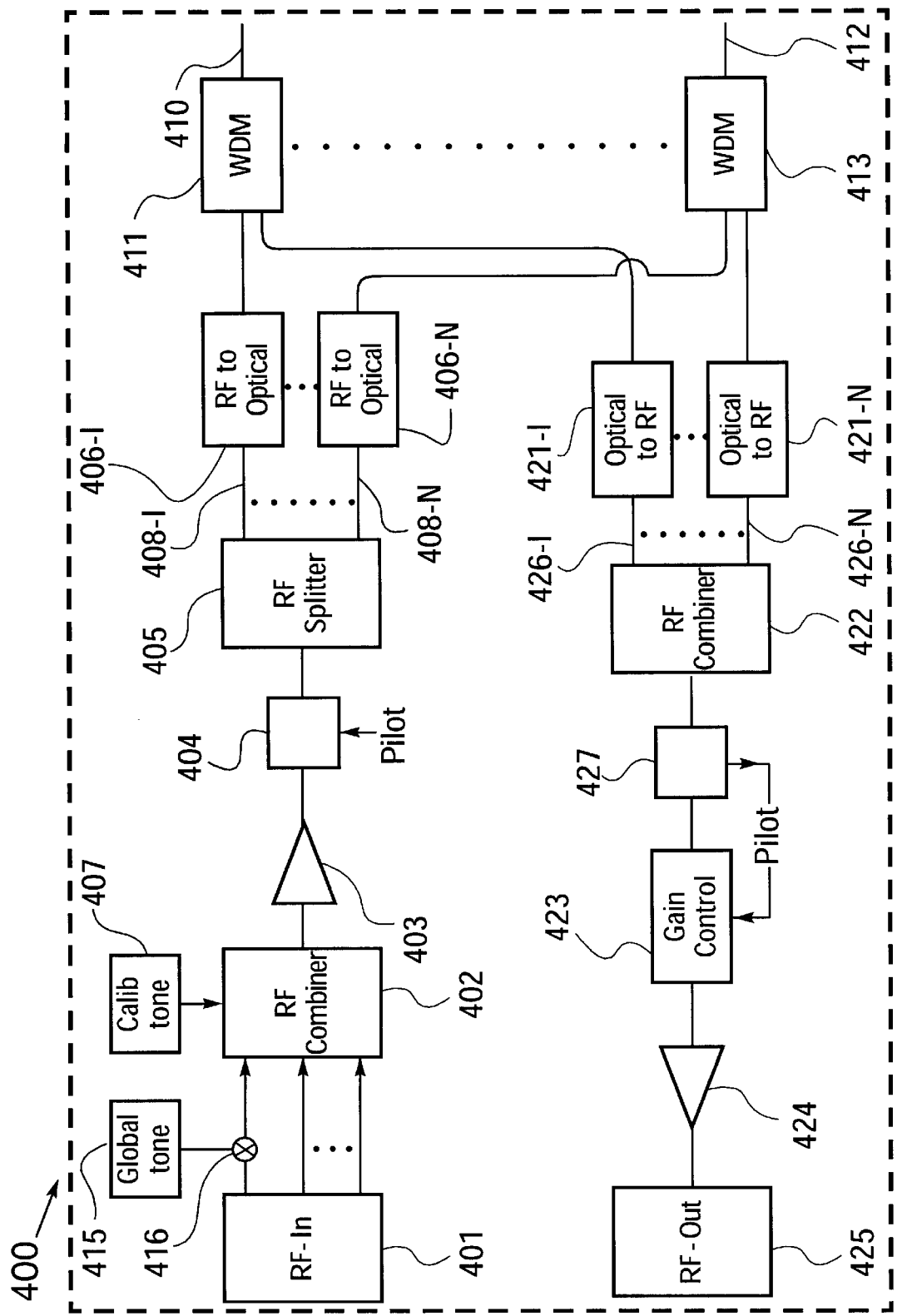
FIGS. 4A–4B depict alternative embodiments of a main unit and a remote unit respectively, according to the present invention.

FIG. 4A depicts an alternative embodiment of a main unit according to the present invention. Main unit 400 comprises a downlink-RF-interface 401 for receiving a plurality of downlink RF-sets in a plurality of downlink frequency bands from a plurality of wireless communications networks; a first global-tone mixer 416 (coupled with a global-tone generator 415) for performing a first global-frequency-translation on one or more downlink RF-sets; a downlink RF-combiner 402 for combining the downlink RF-sets into a combined downlink RF signal; a downlink RF-amplifier 403 for amplifying the combined downlink RF signal; a downlink gain-control-signal combiner 404 for injecting a downlink gain-control-signal in the form of a pilot signal into the combined downlink RF signal; a downlink RF-splitter 405 for splitting the combined downlink RF signal along with the injected pilot signal into multiple downlink RF-parts; and multiple RF-to-optical converters 406-1 through 406-N on the downlink route. A gain-calibration means in the form of a calibration-tone generator 407 is in RF-communication with downlink RF-combiner 402 for purpose of carrying out an end-to-end gain calibration for each of the downlink RF-groups. As such, downlink RF-splitter 405 effectively creates multiple downlink RF-paths 408-1 though 408-N, each including an RF-to-optical converter. Additional downlink RF-signal-conditioning elements, such as RF-filters, downlink gain-adjusting elements and frequency-translation elements, can be further implemented in each of the downlink RF-paths.

Main unit 400 further comprises multiple optical-to-RF converters 421-1 through 421-N for converting multiple uplink optical signals to uplink RF-parts; an uplink RF-combiner 422 for combining the uplink RF-parts into a combined uplink RF signal; an uplink RF-splitting element 427 for extracting a gain-control-signal such as a pilot signal; an uplink gain-control element 423 for using the extracted gain-control-signal to performing gain adjustment; an uplink RF-amplifier 424 for amplifying the combined uplink RF signal; and an uplink-RF-interface 425 for transmitting the combined uplink RF signal to the wireless communications networks. As such, there are multiple uplink RF-paths 426-1 through 426-N converging to uplink RF-combiner 422, wherein each uplink RF-path includes an optical-to-RF converter. Additional uplink RF-signal-conditioning elements (such as RF-filters) can be further implemented in each of the uplink RF-paths.

A notable feature of the embodiment of FIG. 4A is that each downlink optical signal is paired with an uplink optical signal by a wavelength-division-multiplexing (WDM) filter. In this way a single optical fiber, rather than a pair of fibers, is used to support both uplink and downlink optical signals. By way of example, a first downlink optical signal exiting from first downlink RF-path 408-1 and a first uplink optical signal to be directed to first uplink RF-path 426-1 are joined by first WDM filter 411, which is optically coupled to first optical fiber 410. Likewise, an $N^{th}$ optical signal exiting from downlink RF-path 408-N and an $N^{th}$ uplink optical signal to be directed to uplink RF-path 426-N are joined by second WDM filter 413, which is optically coupled to second optical fiber 412; and so on. A WDM filter allows different optical wavelengths to be transmitted/received over a single optical fiber by acting as an optical frequency duplexer. For instance, coarse WDM may be used with the downlink optical signal transmitted at a downlink optical wavelength of 1310 nm and the uplink optical signal transmitted at an uplink optical wavelength of 1550 nm. Other optical wavelengths can be accordingly used as well.

Figure 4B:
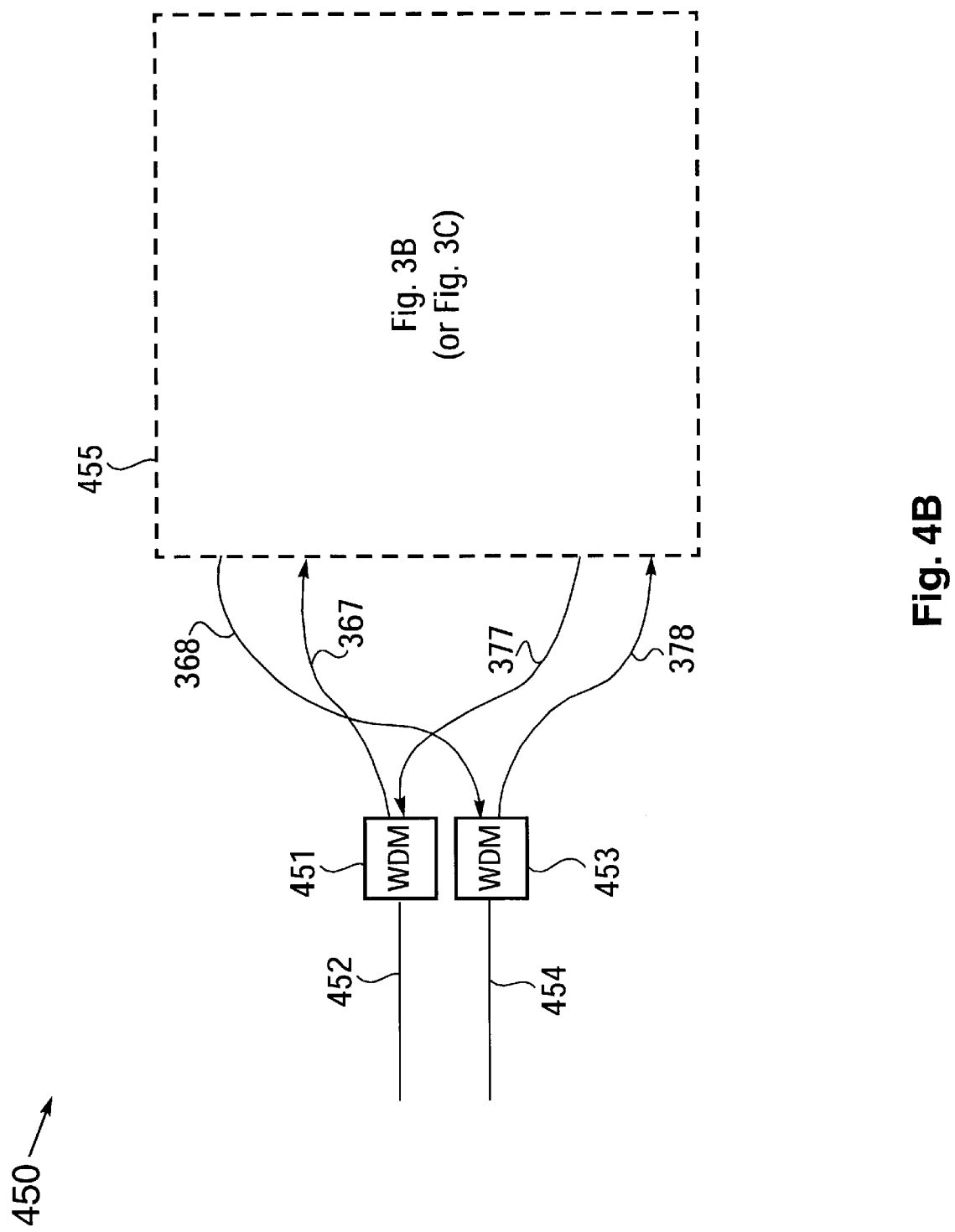

FIG. 4B shows another embodiment of a remote unit according to the present invention. Remote unit 450 makes use of the embodiment of FIG. 3B or FIG. 3C, as marked by dashed box 455 for purpose of illustration, and further utilizes WDM filters to transmit downlink and uplink optical signals along a single optical fiber. As a way of example, a first WDM filter 451 is optically coupled to downlink optical fiber 367 and uplink optical fiber 377, such that the delivered downlink optical signal and the uplink optical signal to be transmitted are multiplexed (e.g., duplexed) onto a first optical fiber 452. Similarly, a second WDM filter 453 is optically coupled to first auxiliary optical fiber 368 and second auxiliary optical fiber 378, such that respective downlink and uplink optical signals corresponding to the downlink RF signals to be diverted to other remote units and the additional uplink RF signals received from other remote units are multiplexed onto a second optical fiber 454.

Figure 5A:
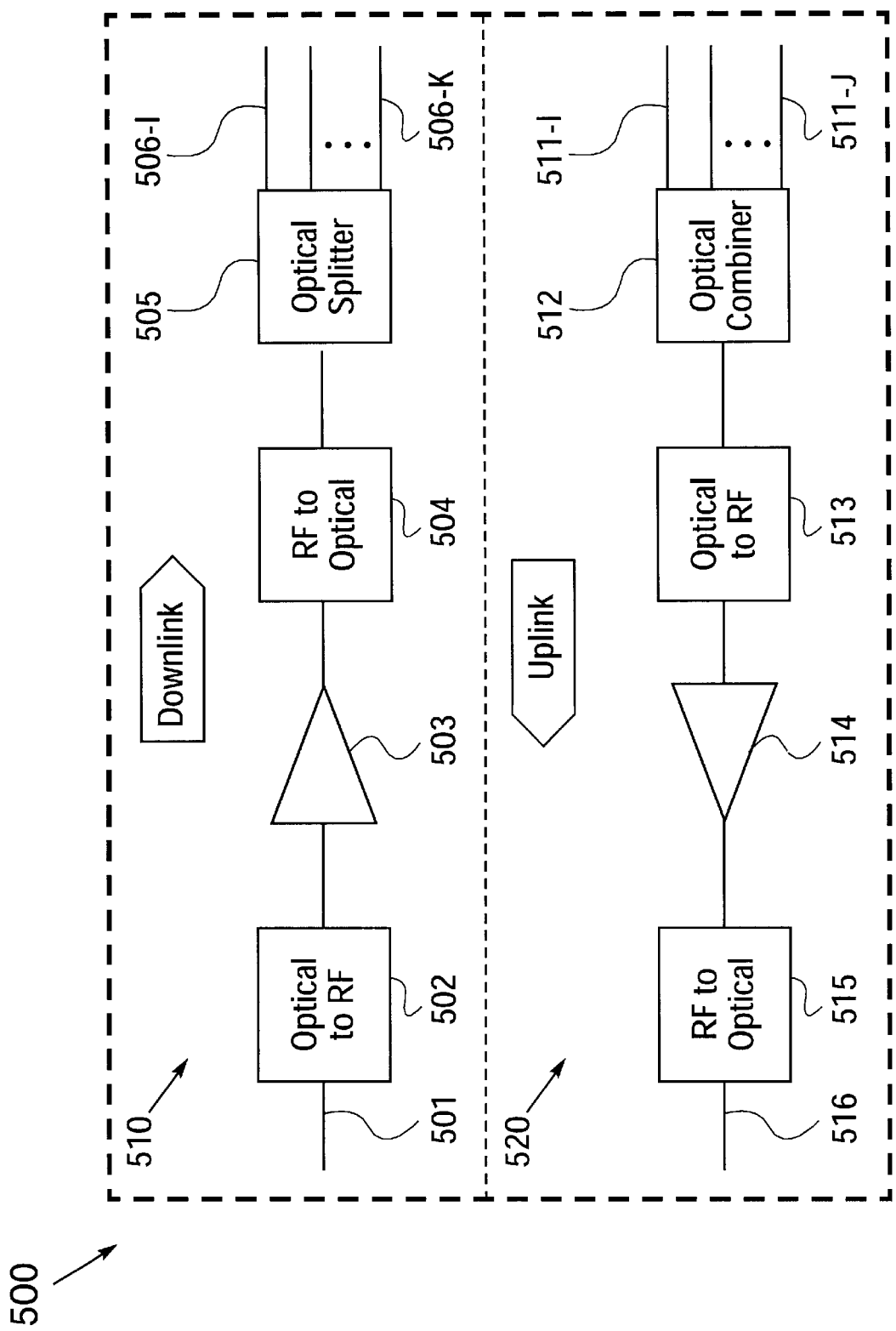
FIGS. 5A–5B depict two exemplary embodiments of an expansion unit according to the present invention.
Figure 5B:
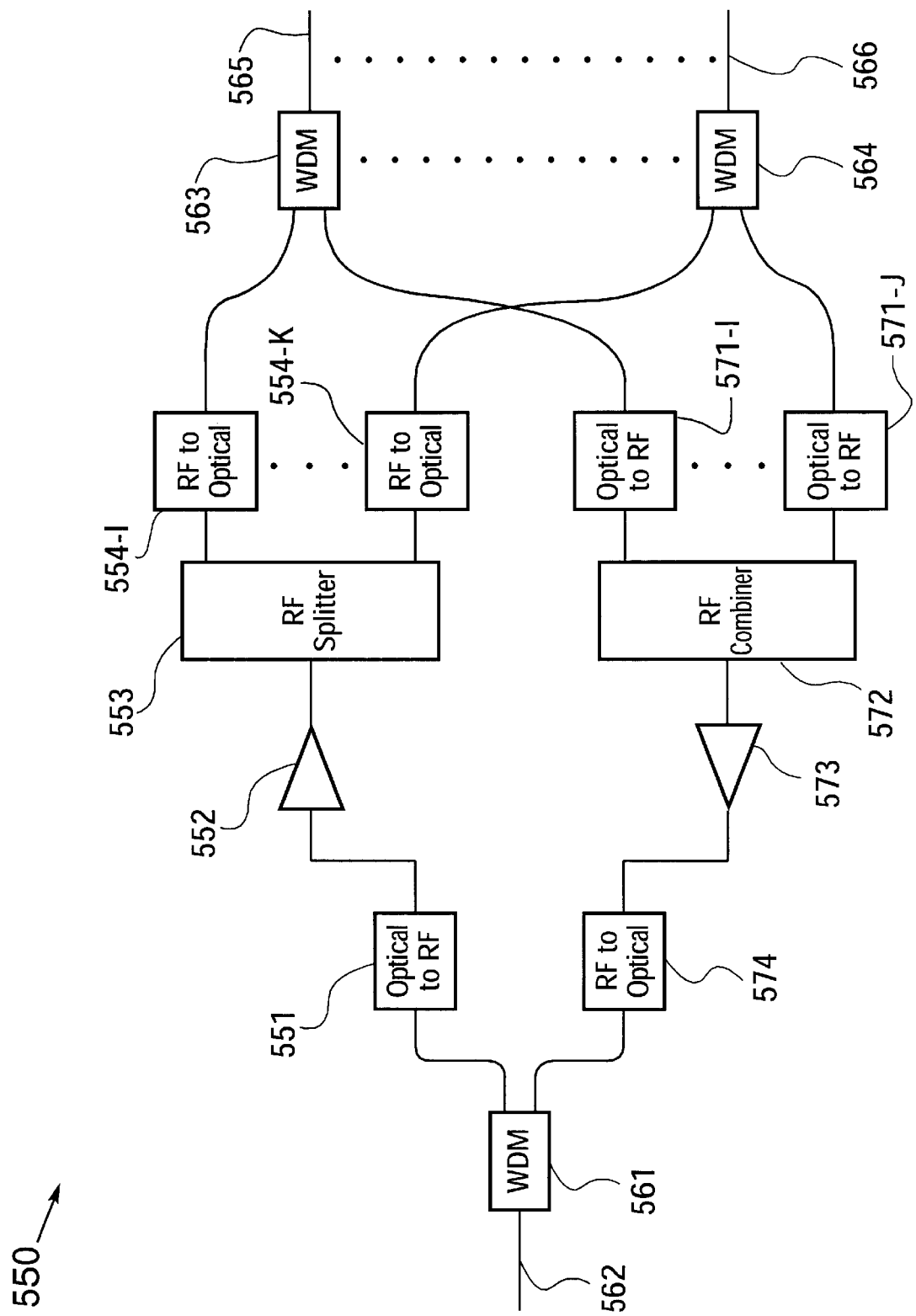

FIGS. 5A–5B show two exemplary embodiments of an expansion unit according to the present invention. In FIG. 5A, expansion unit 500 comprises a downlink assembly 510 and an uplink assembly 520. Downlink assembly 510 includes a downlink optical-to-RF converter 502 for converting a downlink optical signal delivered by a downlink optical fiber 501 to an RF signal; a downlink RF-amplifier 503 for amplifying the RF signal; a downlink RF-to-optical converter 504 for converting the amplified RF signal back to an amplified optical signal; and an optical-splitter 505 for splitting the amplified optical signal into multiple secondary-optical-signals, which are to be transmitted to additional remote units (and/or one or more lower-level expansion units) by multiple secondary-downlink-fibers 506-1 through 506-K (K>1). Uplink assembly 520 includes an optical-combiner 512 for combining multiple uplink optical signals delivered by multiple secondary-uplink-fibers 511-1 through 511-J (J>1) into a combined optical signal; an uplink optical-to-RF converter 513 for converting the combined optical signal to a combined RF signal; an uplink RF-amplifier 514 for amplifying the combined RF signal; and an uplink RF-to-optical converter 515 for converting the amplified RF signal back into a combined uplink optical signal, which is to be transmitted to the main unit (or a higher-level expansion unit) by an uplink optical fiber 516.

FIG. 5B depicts an alternative embodiment of an expansion unit according to the present invention. As a way of example, expansion unit 550 comprises a downlink optical-to-RF converter 551 for converting a downlink optical signal to an RF signal; a downlink RF-amplifier 552 for amplifying the RF signal; a downlink RF-splitter 553 for splitting the amplified RF signal into multiple secondary-RF-signals; and multiple RF-to-optical converters 554-1 through 554-K (K>1) for converting the secondary-RF-signals to secondary-optical-signals on the downlink route. Expansion unit 550 further comprises multiple optical-to-RF converters 571-1 through 571-J (J>1) for converting multiple uplink optical signals to multiple uplink RF signals; an uplink RF-combiner 572 for combining the uplink RF signals into a combined RF signal; an uplink RF-amplifier 573 for amplifying the combined RF signal; and an uplink RF-to-optical converter 574 for converting the amplified RF signal back into a combined uplink optical signal.

In addition to splitting/combining RF signals, as opposed to splitting/combining optical signals in the embodiment of FIG. 5A, another distinct feature of FIG. 5B is that WDM filters are implemented to transmit downlink and uplink optical signals along a single optical fiber. For instance, a first WDM filter 561 is optically coupled to downlink optical-to-RF converter 551 and uplink RF-to-optical converter 574, such that the downlink optical signal delivered and the combined uplink optical signal to be transmitted are multiplexed (e.g., duplexed) onto a single optical fiber 562. Additionally, a plurality of secondary-WDM-filters, including first and second secondary-WDM-filters 563, 564, are optically coupled to downlink RF-to-optical converters 554-1 through 554-K and uplink optical-to-RF converters 571-1 through 571-J on one side, and to a number of secondary-optical-fibers including first and second secondary-fibers 565, 566 on the other. As such, each pair of a secondary downlink optical signal and an uplink optical signal is transmitted on a single optical fiber.

Those skilled in the art will recognize that the exemplary embodiments described above provide only several of many embodiments of the main unit, remote units and expansion units in a multiband distributed wireless communications system according to the present invention. Those skilled in the art will also appreciate that various changes, substitutions, and alternations can be made herein without departing from the principle and the scope of the invention. Accordingly, a variety of multiband distributed wireless communication systems can be constructed in accordance with the principle of the present invention.

For instance, in the embodiment of FIG. 3A or FIG. 4A, the combined downlink RF signal at the main unit may be first converted to a combined optical signal, which is subsequently split into multiple downlink optical signals by an appropriate optical-splitting means known in the art. Likewise, multiple uplink optical signals received at the main unit may be first combined into a combined optical signal by a suitable optical-combining means known in the art, which is then converted to a combined RF signal to be transmitted to the wireless communications networks.

Various RF-splitting means, RF-combining means, RF-filtering means, RF-switching means, and frequency-translation means depicted in the above embodiments can be provided by RF-splitters, RF-combiners, RF-filters, RF-switches, RF-circulators, power combiners, duplexers, triplexers (and other suitable multiplexers), frequency mixers and multipliers known in the art. Various optical fibers are preferably single-mode fibers, though multi-mode fibers can also be implemented if so desired. The conversion between RF signals and optical signals is typically accomplished by using the RF signals to modulate an optical carrier. The wavelength of the optical carrier determines the wavelength of the optical signal.

Moreover, in applications where multiple directional antennae are desired, a plurality of downlink antennae, and/or a plurality of uplink antennae, may be designated to each of the remote units in a multiband distributed wireless communication system according to the present invention.

Additionally, the pilot (or FSK) signals employed in the present invention for the purpose of gain-control can be further utilized to establish digital communications amongst the main unit and remote units. Those skilled in the art will recognize that any other constant envelope signal will be functionally equivalent to a pilot (or FSK) signal. In fact, a non-constant envelope signal may also be used as a gain-control-signal, if so desired. (In such a case, the time-averaged power of the gain-control-signal would be measured to estimate its power level.)

All in all, a skilled artisan will know how to design suitable main units, remote units, and expansion units to construct a multiband distributed wireless communication system in accordance with the present invention, for a given application.

The multiband distributed wireless communication system of the present invention provides many advantages over the prior art systems, summarized as follows:

1. The use of separate downlink and uplink antennae dedicated to each remote unit provides a simple and efficient way to transmit and receive RF signals in multiple frequency bands on the downlink and uplink. Such an implementation is especially effective when dealing with multiple (e.g., more than two) wireless frequency bands, including intertwined bands (such as cellular and iDEN bands). Moreover, having separate uplink and downlink antennae enables the reception of uplink RF signals and the transmission of downlink RF signals to be spatially separated in the present invention. Such a spatial separation creates a propagation loss between the transmit (downlink) and receive (uplink) antennae, which helps protect the sensitive uplink receivers from being desensitized by strong downlink RF signals and/or by downlink intermodulation products that fall into one or more uplink frequency bands.

2. By separating downlink (or uplink) RF signals according to frequency band in each remote unit, RF signals in different frequency bands are individually conditioned (e.g., amplified and filtered), before being recombined to be transmitted to a downlink antenna.

3. Various frequency translations employed in the present invention provide many advantages. First, by placing the downlink RF-sets in disjoint frequency bands that are sufficiently far apart, global-frequency-translations make it possible to separate downlink RF signals into downlink RF-groups using feasible means (such as RF-filtering) in a remote unit, such that these downlink RF-groups can be individually conditioned (e.g., filtered and amplified) before being transmitted to a downlink antenna. The global-frequency-translations can also be effectively used to prevent the interference effects and intermodulation products amongst different frequency bands. Second, local-frequency-translations carried out in a remote unit enable the downlink (or uplink) RF-groups to be more effectively filtered by placing some of them in intermediate frequency bands. For instance, in the United Kingdom extended-GSM band, the downlink frequency band is only 10 MHz above the uplink frequency band. Without filtering in an intermediate frequency band as described above, it would be very difficult to prevent the downlink noise from appearing in the uplink band and thereby desensitizing the receivers on the uplink. But local-frequency-translation of the downlink band to a lower frequency enables the economical filtering of the downlink noise that would otherwise be transmitted into the uplink band. Another case in point is that without global-frequency-translation, the iDEN downlink band (851–869 MHz) would be too close to the cellular uplink band (824–849 MHz) for economical separation of these two frequency bands, thereby rendering filtering/amplifying of RF signals in each of the frequency bands practically impossible. As such, these frequency translations effectively facilitate the transportation and distribution of wireless RF signals in multiple frequency bands, and are particularly desirable when dealing with RF signals in adjacent (and/or intertwined) frequency bands.

4. The gain for each of the downlink RF-groups is individually calibrated and established at a prescribed level, and further maintained over temperature changes and other effects.

5. The present invention support supports both FDD and TDD protocols in a simple and flexible way. The use of an RF-switching means to couple a TDD antenna to a remote unit, or the implementation of appropriate RF-switches coupled with an RF power-detecting means in a remote unit, provides a simple and effective way of transmitting and receiving TDD signals. Such implementations further prevent the noise transmitted on the downlink from desensitizing the reception on the uplink. It also prevents strong downlink TDD signals from damaging the sensitive receiving circuitry on the uplink.

6. The employment of a novel hybrid star/cascaded architecture provides a modular, flexible and efficient way of distributing multiband wireless RF signals. Such a novel architecture is particularly effective in an indoor environment. (For instance, various remote units can be installed on different floors, or in even different rooms of a residential building. When a new building is constructed in a residential complex, an expansion unit can be installed to provide the wireless communications coverage to the new building, without disrupting the overall operation of the existing system.)

7. The use of a pilot or FSK signal not only provides an effective way of maintaining the desired gain for each of the downlink RF-groups (and also for RF signals on the uplink), it can also be utilized to establish an effective communication link between the main unit and the remote units.

8. The use of WDM filters reduces the number of optical fibers to be deployed in the system, which simplifies the overall structure and lowers the cost of deployment.

As such, the present invention provides an efficient, flexible, and economical way of transporting and distributing wireless communication signals in multiple (adjacent, intertwined, or otherwise) frequency bands.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A method of distributing multiband radio frequency (RF) signals in a wireless communications system, comprising:

a) receiving at a main unit a plurality of downlink RF-sets in a plurality of downlink frequency bands, wherein each of said downlink RF-sets contains downlink RF signals in one of said downlink frequency bands;

b) combining said downlink RF-sets into a multiband combined downlink RF signal;

c) splitting said multiband combined downlink RF signal into multiple multiband downlink RF-parts;

d) converting said multiple multiband downlink RF-parts to multiple downlink optical signals;

e) optically transmitting said downlink optical signals to multiple remote units;

f) receiving a delivered downlink optical signal at each of said remote units;

g) converting said delivered downlink optical signal to a multiband delivered downlink RF-part;

h) separating said multiband delivered downlink RF-part into a plurality of downlink RF-groups by frequency band;

i) performing individual downlink-signal-conditioning on each of said downlink RF-groups, including one or more steps of RF-amplifying, gain-adjusting, and RF-filtering;

j) combining said individual-conditioned downlink RF groups into a multiband downlink RF transmit signal; and k) transmitting said multiband downlink RF transmit signal to at least one dedicated downlink antenna;

wherein said at least one dedicated downlink antenna is not used for uplink reception.

2. The method of claim 1 further comprising the step of performing a first global frequency-translation on at least one of said downlink RF-sets preceding step b), whereby said downlink RF-sets are placed in disjoint frequency bands that are separated in frequency.

3. The method of claim 2 further comprising the step of performing a second global frequency-translation on at least one of said downlink RF-groups, whereby said downlink RF-groups are placed back into said downlink frequency bands.

4. The method of claim 1 further comprising the step of performing a first local frequency-translation on at least one of said downlink RF-groups following said step h) and preceding said step i), so as to place said at least one of said downlink RF-groups in an intermediate frequency band.

5. The method of claim 4 further comprising the step of performing a second local frequency-translation on said at least one of said downlink RF-groups following said step i), so as to substantially undo the effect of said first frequency-translation.

6. The method of claim 1 further comprising the step of carrying out an end-to-end gain calibration, thereby setting a prescribed gain for each of said downlink RF-groups in each of said remote units.

7. The method of claim 6 wherein a calibration-tone signal is used to carry out said end-to-end gain calibration, and wherein said calibration-tone signal is set to a frequency within a frequency band of each of said downlink RF-groups to be calibrated.

8. The method of claim 6 further comprising the step of injecting a downlink-gain-control signal to each of said downlink RF-parts, wherein said gain-control-signal is set at a frequency outside of any of said downlink frequency bands.

9. The method of claim 8 further comprising the step of detecting and thereby using said downlink-gain-control signal to maintain said prescribed gain in each of said remote units.

10. The method of claim 1 further comprising the step of diverting a fraction of said delivered downlink RF-part to one or more additional remote units.

11. The method of claim 1 further comprising the step of transmitting a specific downlink optical signal to an expansion unit, wherein said specific downlink optical signal is amplified and further divided into multiple secondary-optical-signals, and wherein said secondary-optical-signals are transmitted to a plurality of additional remote units.

12. The method of claim 1 further comprising:
1) receiving at each of said remote units multiple multiband uplink RF signals in a plurality of uplink frequency bands from at least one dedicated uplink antenna, wherein said at least one dedicated uplink antenna is not used for downlink transmission;
2) separating said multiband uplink RF signals into a plurality of uplink RF-groups by frequency band;
3) performing individual uplink-signal-conditioning on each of said uplink RF-groups, including one or more steps selected from the group consisting of RF-amplifying, gain-adjusting, and RF-filtering;
4) combining said uplink RF-groups into a multiband uplink RF-part; and
5) converting said multiband uplink RF-part to an uplink optical signal;
whereby multiple uplink optical signals corresponding to multiple uplink RF-parts are optically transmitted from said remote units to said main unit.

13. The method of claim 12 further comprising the step of performing a first frequency-translation on at least one of said uplink RF-groups preceding said step 3), so as to place said at least one of said uplink RF-groups in an intermediate frequency band.

14. The method of claim 13 further comprising the step of performing a second frequency-translation on said at least one of said uplink RF-groups, so as to substantially undo the effect of said first frequency-translation.

15. The method of claim 12 wherein said step 4) further comprises the step of combining with said uplink RF-part additional uplink RF signals transmitted from one or more additional remote units.

16. The method of claim 12 further comprising the step of transmitting downlink RF signals in a TDD frequency band from each of said remote units to a TDD antenna and receiving at each of said remote units uplink RF signals in said TDD frequency band from said TDD antenna by actuating an RF-switching means.

17. The method of claim 16 wherein said RF-switching means is actuated according to a power level of said downlink RF signals in said TDD frequency band.

18. The method of claim 12 further comprising the step of using an RF-switching means to enable transmission of downlink RF signals in a TDD frequency band from each of said remote units to said at least one dedicated downlink antenna and to allow reception of uplink RF signals in said TDD frequency band at each of said remote units from said at least one dedicated uplink antenna.

19. The method of claim 18 wherein said RF-switching means is actuated according to a power level of said downlink RF signals in said TDD frequency band.

20. The method of claim 12 further comprising the following steps carried out at said main unit:
(1) receiving said uplink optical signals;
(2) converting said uplink optical signals to said multiband uplink RF-parts;
(3) combining said multiband uplink RF-parts into a multiband combined uplink RF signal; and
(4) transmitting said multiband combined uplink RF signal to a plurality of wireless communications networks.

21. The method of claim 12 further comprising the step of transmitting a plural number of said uplink optical signals to an expansion unit, wherein said plural number of said uplink optical signals are amplified and combined to a combined optical signal.

22. The method of claim 21 wherein said combined optical signal is transmitted to said main unit.

23. The method of claim 21 wherein said combined optical signal is transmitted to a higher-level expansion unit.

24. A multiband distributed wireless communications system comprising:
(a) a main unit comprising:
(1) a downlink-RF-interface for receiving a plurality of downlink RF-sets in a plurality of downlink frequency bands, wherein each of said downlink RF-sets contains downlink RF signals in one of said downlink frequency bands;
(2) a downlink RF-combining means for combining said downlink RF-sets into a multiband combined downlink RF signal;
(3) a downlink RF-splitting means for splitting said multiband combined downlink RF signal into multiple multiband downlink RF-parts; and
(4) multiple RF-to-optical converters for converting said multiple multiband downlink RF-parts to multiple downlink optical signals;
(b) multiple remote units optically coupled to said main unit, each comprising:
(5) a remote optical-to-RF converter for converting a delivered downlink optical signal to a multiband delivered downlink RF-part;
(6) a downlink splitting-filtering means for separating said multiband delivered downlink RF-part into a plurality of downlink RF-groups by frequency band;
(7) a plurality of downlink-signal-conditioning assemblies for performing individual downlink-signal-conditioning on each of said downlink RF-groups; and
(8) a downlink filtering-combining means for combining said individual-conditioned downlink RF-groups into a multiband downlink RF-transmit signal;
(c) multiple dedicated downlink antennae, wherein each of said remote units is in RF-communication with at least one of said dedicated downlink antennae, whereby said multiband downlink RF-transmit signal is transmitted to said at least one of said dedicated downlink antennae;
wherein said dedicated downlink antennae are not used for uplink reception.

25. The multiband distributed wireless communications system of claim 24 further comprising a frequency-translation means.

26. The multiband distributed wireless communications system of claim 25 wherein said frequency-translation means performs a first frequency-translation on at least one of said downlink RF-sets, whereby said downlink RF-sets are placed in disjoint frequency bands that are separated in frequency.

27. The multiband distributed wireless communications system of claim 26 wherein said frequency-translation means comprises a central global-tone mixer coupled to a global-tone generator, in RF-communication with said downlink-RF-interface and said downlink RF-combining means.

28. The multiband distributed wireless communications system of claim 26 wherein said frequency-translation means further performs a second frequency-translation on at least one of said downlink RF-groups in each of said remote units, whereby said downlink RF-groups are placed back into said downlink frequency bands.

29. The multiband distributed wireless communications system of claim 28 wherein said frequency-translation means further comprises multiple remote global-tone mixers coupled to one or more global-tone generators, and wherein there is at least one of said remote global-tone mixers in each of said remote units, in RF-communication with at least one of said downlink-signal-conditioning assemblies.

30. The multiband distributed wireless communications system of claim 25 wherein said frequency-translation means performs a first frequency-translation on at least one of said downlink RF-groups, so as to place said at least one of said downlink RF-groups in an intermediate frequency band.

31. The multiband distributed wireless communications system of claim 30 wherein said frequency-translation means performs a second frequency-translation on said at least one of said downlink RF-groups, so as to substantially undo the effect of said first frequency-translation.

32. The multiband distributed wireless communications system of claim 30 wherein said frequency-translation means comprises multiple local-tone mixers coupled to one or more local-tone generators, and wherein there is at least one of said local-tone mixers in each of said remote units, in RF-communication with at least one of said downlink-signal-conditioning assemblies.

33. The multiband distributed wireless communications system of claim 24 further comprising a gain-calibration means for performing an end-to-end gain calibration throughout said multiband distributed wireless communications system, thereby setting a prescribed gain for each of said downlink RF-groups.

34. The multiband distributed wireless communications system of claim 33 wherein said gain-calibration means comprises a calibration-tone generator, coupled to said downlink RF-combining means and said downlink RF-splitting means by way of an RF-switch.

35. The multiband distributed wireless communications system of claim 33 further comprising a downlink gain-control-signal combiner, for injecting a downlink gain-control signal to each of said downlink RF-parts, wherein said gain-control-signal is set to a frequency outside of any of said downlink frequency bands.

36. The multiband distributed wireless communications system of claim 35 wherein each of said remote units further comprises a downlink RF-splitting element coupled to a downlink-gain-control element, for detecting and thereby using said downlink-gain-control signal to maintain said prescribed gain.

37. The multiband distributed wireless communications system of claim 35 wherein said gain-control-signal is selected from the group consisting of Frequency-Shift-Key (FSK) signals, pilot signals, and constant-envelope signals.

38. The multiband distributed wireless communications system of claim 24 wherein each of said downlink-signal-conditioning assemblies comprises one or more elements selected from the group consisting of RF-amplifiers, gain-control elements, and RF-filters.

39. The multiband distributed wireless communications system of claim 24 wherein each of said remote units further comprises a downlink RF-splitting element coupled to said remote optical-to-RF converter, whereby a fraction of said delivered downlink RF-part is diverted to an auxiliary RF-to-optical converter.

40. The multiband distributed wireless communications system of claim 24 further comprising multiple dedicated uplink antennae, such that each of said remote units is in RF-communication with at least one of said dedicated uplink antennae, wherein each of said remote units further comprises:
  (9) an uplink splitting-filtering means for separating multiple uplink RF signals in a plurality of uplink frequency bands into a plurality of uplink RF-groups by frequency band, wherein said uplink RF signals are transmitted from said at least one of said dedicated uplink antennae;
  (10) a plurality of uplink-signal-conditioning assemblies for performing individual uplink-signal-conditioning on each of said uplink RF-groups;
  (11) an uplink filtering-combining means for combining said uplink RF-groups into an multiband uplink RF-part; and
  (12) a remote RF-to-optical converter for converting said multiband uplink RF-part to an uplink optical signal;
  wherein said dedicated uplink antennae are not used for downlink transmission.

41. The multiband distributed wireless communications system of claim 40 further comprising a frequency-translation means, wherein said frequency-translation means performs a first frequency-translation on at least one of said uplink RF-groups, so as to place said at least one of said uplink RF-groups in an intermediate frequency band.

42. The multiband distributed wireless communications system of claim 41 where in s aid frequency-translation means performs a second frequency-translation on said at least one of said uplink RF-groups, so as to substantially undo the effect of said first frequency-translation.

43. The multiband distributed wireless communications system of claim 41 wherein said frequency-translation means comprises multiple local-tone mixers coupled to one or more local-tone generators, and wherein there is at least one of said local-tone mixers in each of said remote units, in RF-communication with at least one of said uplink-signal-conditioning assemblies.

44. The multiband distributed wireless communications system of claim 40 wherein each of said remote units is in RF-communication with a dedicated TDD antenna by an RF-switching means, whereby said dedicated TDD antenna transmits downlink RF signals in a TDD frequency band and receives uplink RF signals in said TDD frequency band by way of actuating said RF-switching means.

45. The multiband distributed wireless communications system of claim 44 wherein said RF-switching means is actuated according to a power level of said downlink RF signals in said TDD frequency band.

46. The multiband distributed wireless communications system of claim 45 wherein said RF-switching means comprises an RF-switching element coupled to a downlink power-detect element, and wherein said RF-switching element is selected from the group consisting of RF Transmit/Receive switches, RF circulators, and power combiners.

47. The multiband distributed wireless communications system of claim 40 wherein each of said remote units further comprises an RF-switching means including downlink and uplink RF-switches coupled to a downlink power-detect element, and wherein said RF-switching means enables transmission of downlink RF signals in a TDD frequency band to said at least one of said dedicated downlink antennae, and allows reception of uplink RF signals in said TDD frequency band from said at least one of said dedicated uplink antennae.

48. The multiband distributed wireless communications system of claim 47 wherein said RF-switching means is actuated according to a power level of said downlink RF signals in said TDD frequency band.

49. The multiband distributed wireless communications system of claim 40 wherein each of said uplink-signal-conditioning assemblies comprises one or more elements selected from the group consisting of RF-amplifiers, gain-control elements, and RF-filters.

50. The multiband distributed wireless communications system of claim 40 wherein each of said remote units further comprises an uplink RF-combining element coupled to said remote RF-to-optical converter, such that additional uplink RF signals delivered by an auxiliary optical-to-RF converter are combined with said uplink RF-part.

51. The multiband distributed wireless communications system of claim 40 wherein said main unit further comprises:

(13) multiple optical-to-RF converters for converting said multiple uplink optical signals to said multiple multiband uplink RF-parts;

(14) an uplink RF-combining means for combining said multiband uplink RF-parts into a multiband combined uplink RF signal; and

(15) an uplink-RF-interface for transmitting said multiband combined uplink RF signal to said plurality of wireless communications networks.

52. The multiband distributed wireless communications system of claim 51 wherein said main unit further comprises at least one downlink RF-amplifier and at least one uplink RF-amplifier, whereby said downlink RF-parts and said uplink RF-parts are amplified.

53. The multiband distributed wireless communications system of claim 24 further comprising one or more expansion units, optically coupled to said main unit and said remote units, wherein each of said expansion units comprises:

(a) a downlink assembly, including a downlink optical-to-RF converter, a downlink RF-amplifier, a downlink RF-to-optical converter, and an optical-splitting means; and (b) an uplink assembly, including an optical-combining means, an uplink optical-to-RF converter, an uplink RF-amplifier, and an uplink RF-to-optical converter.

54. The multiband distributed wireless communications system of claim 24 wherein said remote units are optically coupled to said main unit by a plurality of optical fibers.

55. The multiband distributed wireless communications system of claim 54 wherein said main unit further comprises a plurality of WDM filters optically coupled to one or more of said optical fibers.

56. The multiband distributed wireless communications system of claim 24 wherein said downlink RF-sets are received from a plurality of wireless communications networks, selected from the group consisting of paging, cellular, PCS, UMTS, GSM, CDMA, TDD, FDMA, GPS, EDGE, W-CDMA, bluetooth, WLAN (wide area data) and LAN (local area data) networks.

* * * * *